United States Patent
Schumacher et al.

(10) Patent No.: US 11,326,630 B2
(45) Date of Patent: May 10, 2022

(54) TOOLLESS CLAMP

(71) Applicant: Domaille Engineering, LLC, Rochester, MN (US)

(72) Inventors: Gregory A. Schumacher, Plainview, MN (US); Jill B. Christie, St. Charles, MN (US); Timothy E. Kanne, Rochester, MN (US); Peter N. Torgerson, West Concord, MN (US); Brian M. Fredrickson, Rochester, MN (US)

(73) Assignee: Domaille Engineering, LLC, Rochester, MN (US)

( * ) Notice: Subject to any disclaimer, the term of this patent is extended or adjusted under 35 U.S.C. 154(b) by 0 days.

(21) Appl. No.: 17/111,116

(22) Filed: Dec. 3, 2020

(65) Prior Publication Data

US 2021/0270299 A1    Sep. 2, 2021

Related U.S. Application Data

(60) Provisional application No. 62/982,906, filed on Feb. 28, 2020.

(51) Int. Cl.
*F16B 2/18*    (2006.01)
*B25B 5/16*    (2006.01)

(52) U.S. Cl.
CPC . *F16B 2/18* (2013.01); *B25B 5/16* (2013.01)

(58) Field of Classification Search
None
See application file for complete search history.

(56) References Cited

U.S. PATENT DOCUMENTS

| | | | |
|---|---|---|---|
| 7,738,760 B2 | 6/2010 | Fredrickson et al. | |
| 7,934,710 B2 * | 5/2011 | Chiu | B25B 5/062 269/24 |
| 8,708,776 B1 | 4/2014 | Frazer | |
| 9,897,766 B2 | 2/2018 | Gniadek | |
| 2005/0218758 A1 | 10/2005 | Thackery et al. | |

(Continued)

OTHER PUBLICATIONS

Domaille Engineering, APM-HDC-5300 Series Fiber Optic Polishing Machine User's Guide, 40 pages, Edition 2, Nov. 2014.

(Continued)

*Primary Examiner* — Joseph J Hail
*Assistant Examiner* — Timothy Brady
(74) *Attorney, Agent, or Firm* — Dicke, Billig & Czaja, PLLC

(57) ABSTRACT

A toolless clamp comprises a shaft, a base, a latch, a first biasing member, and a clamping member. The base has a base bore configured and arranged to slidably receive a portion of the shaft. The latch has a latch bore configured and arranged to slidably receive a portion of the shaft and a portion of the base. The first biasing member is configured and arranged to bias the latch in a first direction away from the clamping member in an unclamped position and bias the shaft and clamping member in a second direction toward the base in a clamped position. The clamping member is operatively connected to a proximal end of the shaft and is configured and arranged to disengage the connecting member when the latch is in the unclamped position and engage the connecting member when the latch is in the clamped position.

14 Claims, 23 Drawing Sheets

(56) References Cited

U.S. PATENT DOCUMENTS

2018/0236626 A1    8/2018  Shibutani
2019/0030681 A1    1/2019  Shibutani
2019/0265418 A1    8/2019  Gniadek

OTHER PUBLICATIONS

TXO Optics, Fibre Optice Connector Guide, 6 pages, dated Dec. 6, 2017, accessed at https://www.txo-optics.com/fibre-optic-connector-guide/ on Feb. 5, 2020.
Senko Group, Senko Advanced Components, Termination Procedure ST One Piece Connector, Document No. ETP-1105-006-05, 10 pages, Nov. 8, 2005.

\* cited by examiner

TOOLLESS CLAMP

CROSS-REFERENCE TO RELATED APPLICATIONS

This application claims the benefit of U.S. Provisional Application Ser. No. 62/982,906, filed Feb. 28, 2020, which is incorporated in its entirety herein by reference.

BACKGROUND

A fiber optic cable generally includes a protective or supporting material through which an optical fiber extends. The cables typically have connectors located on each end to connect them to other fiber optic cables or to peripheral devices, and the connectors are high precision devices that position the fibers in the cables for optimal connection.

In order to pass light signals thru fiber optic cables, the end face of the connector (from which a ferrule and an optical fiber extend) must abut an adjacent cable connector in a specific manner. The high tolerances required of the parts to make these connections lead to precise shaping of the ends via cleaving, cutting, and/or polishing. Apex offset, radius of curvature, fiber protrusion/recession, and angularity are all geometric parameters of a fiber end face that play into the quality of the signal passing thru the cable. Final test measurements for back reflection and insertion loss are typically used as the final checks to determine the quality of the geometry (as well as the alignment, cleanliness, and surface finish of the finished cable.) As such, the end face is usually polished to exacting standards so as to produce a finished product with minimal back reflection and loss. For example, it is often necessary to polish the end face of the connector to a precise length, i.e., so the end face projects a predetermined amount from a reference point such as a shoulder on the fiber optic connector within a predetermined tolerance. Fiber optic cables having multiple optical fibers can also be polished to produce a particular performance specification.

Optical fiber polishers typically include a rotating platen and an arm mechanism that positions and supports the connectors during the polishing process. Typically, the end face is lowered onto a film resting on the platen, and depending upon the film, the speed of the platen, the pressure applied, and its duration, acquires a product suitable for a particular application.

Optical fiber polishers generally include a fixture coupled to the arm mechanism that is capable of holding and gripping one or more fiber optic connectors and advancing them under controlled conditions of speed and force to engage a plurality of fiber optic ends into engagement with a polishing member such as a rotatable platen having an abrasive surface. In order to achieve the precision typically needed, the fiber optic connectors must be secured within the fixture in such a way that all the connectors protrude from the bottom of the fixture at the same angle and to the same extent, thus assuring that each optical fiber is polished at the same degree and extent.

As such, fixtures typically employ complex clamping assemblies that are used to hold the connectors at the desired angle and depth. These clamping assemblies can require extensive manipulation from an operator in order to load and unload the connectors from the fixture, thus increasing the time needed to polish multiple connectors. In addition, existing fixtures can present obstacles when one or more of the clamping assemblies needs replacing. For example, when even a single clamping assembly needs replacing, an operator may need to halt polishing in order to send the entire fixture back to the manufacturer for repairs.

For the reasons stated above and for other reasons stated below, which will become apparent to those skilled in the art upon reading and understanding the present specification, a need exists for the present invention.

SUMMARY

The above-mentioned problems associated with prior devices are addressed by embodiments of the disclosure and will be understood by reading and understanding the present specification. The following summary is made by way of example and not by way of limitation. It is merely provided to aid in understanding some of the aspects of the invention.

In one embodiment, a toolless clamp for clamping a connecting member to a support structure comprises a shaft, a base, a latch, a first biasing member, and a clamping member. The shaft has an intermediate portion interconnecting a proximal end and a distal end. The base has a base bore configured and arranged to slidably receive a portion of the shaft. The latch has a latch bore configured and arranged to slidably receive a portion of the shaft and a portion of the base. The clamping member is operatively connected to the proximal end of the shaft and is configured and arranged to disengage the connecting member when the latch is in an unclamped position and engage the connecting member when the latch is in a clamped position. The first biasing member is configured and arranged to bias the latch in a first direction away from the clamping member in the unclamped position and bias the shaft and the clamping member in a second direction toward the base in the clamped position.

In one embodiment, a combination toolless clamp and fiber optic polishing fixture are configured and arranged for polishing a cable of a fiber optic cable assembly including a shoulder. The toolless clamp comprises a shaft, a base, a latch, a first biasing member, and a clamping member. The shaft has an intermediate portion interconnecting a proximal end and a distal end. The base has a base bore configured and arranged to slidably receive a portion of the shaft. The latch has a latch bore configured and arranged to slidably receive a portion of the shaft and a portion of the base. The clamping member is operatively connected to the proximal end of the shaft and is configured and arranged to disengage the connecting member when the latch is in an unclamped position and engage the connecting member when the latch is in a clamped position. The first biasing member is configured and arranged to bias the latch in a first direction away from the clamping member in the unclamped position and bias the shaft and the clamping member in a second direction toward the base in the clamped position. The fiber optic polishing fixture comprises a fixture base having a cable aperture and a clamping member aperture. The cable aperture is configured and arranged to receive a portion of the shoulder, and the clamping member aperture is configured and arranged to slidably receive a portion of the clamping member.

In one embodiment, a method of clamping a fiber optic cable assembly onto a fiber optic polishing fixture using a clamp assembly operatively connected to the fiber optic polishing fixture comprises inserting a portion of the fiber optic cable assembly into a cable aperture of the fiber optic polishing fixture, and rotating a latch about a clamp base of a clamp assembly to move a shaft and a clamping member from an unclamped position into a clamped position. The clamped position being when the clamping member engages the fiber optic cable assembly and thereby transfers a force of the biasing member to the fiber optic cable assembly thereby securing it within a cable aperture of the fiber optic polishing fixture.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. In accordance with common practice, the various described features are not drawn to scale but are drawn to emphasize specific features relevant to the present disclosure. Reference characters denote like elements throughout the Figures and the text.

DETAILED DESCRIPTION

In the following detailed description, reference is made to the accompanying drawings, which form a part hereof, and in which is shown by way of illustration embodiments in which the disclosure may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that other embodiments may be utilized and mechanical changes may be made without departing from the spirit and scope of the present disclosure. The following detailed description is, therefore, not to be taken in a limiting sense.

Figure 1:
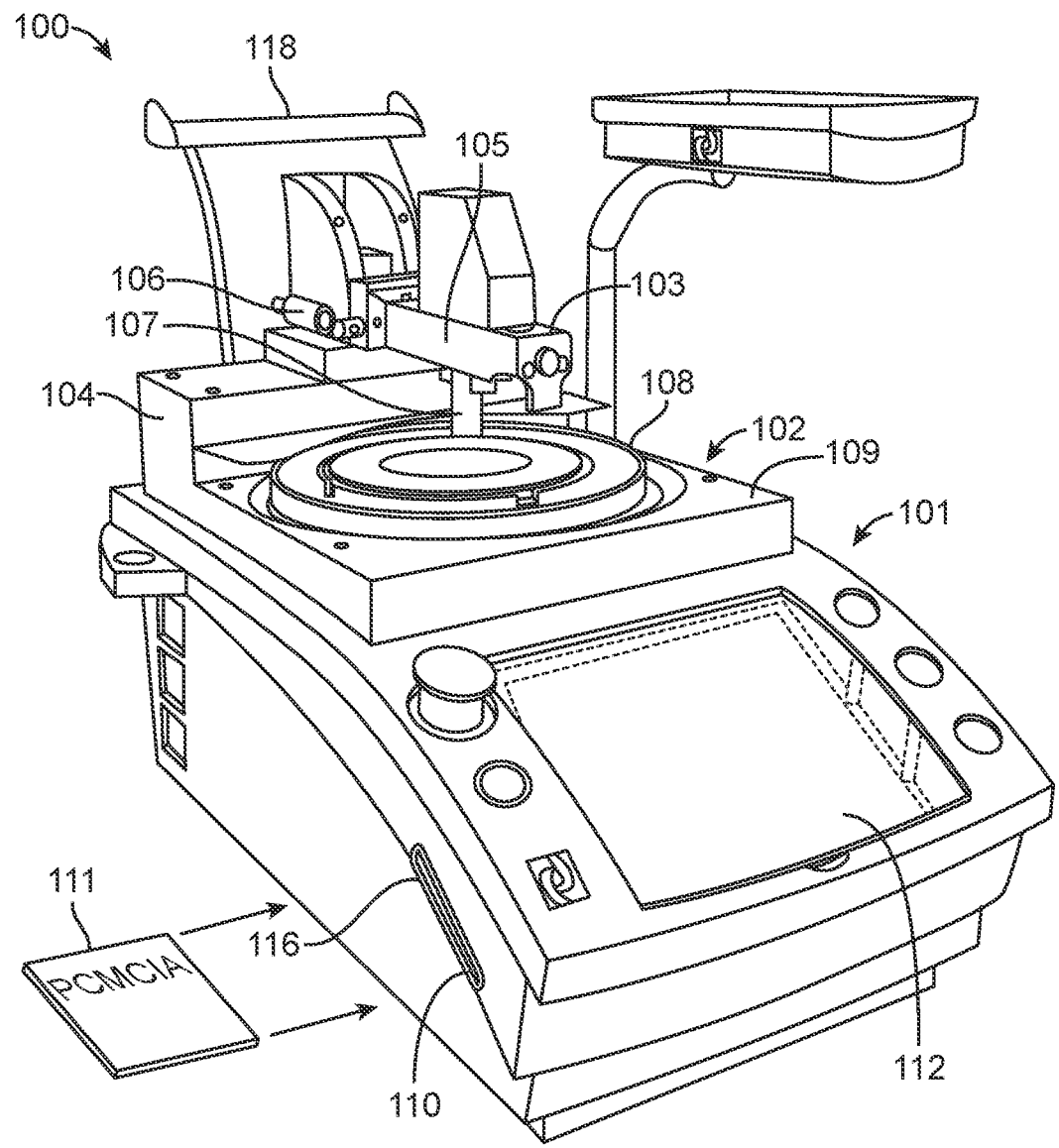
FIG. 1 is a perspective view of an optical fiber polisher.

FIG. 1 is a perspective view of an optical fiber polisher 100 constructed in accordance with the principles of the present invention. This type of optical fiber polisher 100 is shown and described in U.S. Pat. Nos. 7,738,760 and 8,708,776, which are hereby incorporated by reference, and is Optical Fiber Polishing Machine APM Model HDC-5300 by Domaille Engineering, LLC of Rochester, Minn. Although optical fiber polisher 100 is generally shown and described, it is recognized that other suitable types of polishers could be used with the present invention.

Generally, the polisher 100 includes a polishing unit 102 comprising a pneumatic overarm assembly 103, a platen assembly 108 rotatably supported by a stage 109, a processor, a porting device 110 for a portable memory device 111, and an input device 112. A housing 101 supports and aligns the polishing unit 102, the processor, and the input device 112 in an operative position. A slot 116 is inserted along one side of the housing 101 to allow the portable memory device 111 to access the porting device 110. A cable management attachment 118 is connected to the back of the housing 101 for supporting fiber optic cables undergoing a polishing process.

The pneumatic overarm assembly 103 includes an overarm 105 hingedly secured along one end to a base 104, the overarm 105 rotatable about the hinged end. A pair of pneumatic cylinders 106 is coupled to the overarm 105, opposing rotational movement thereof. A mounting pole 107 extends downward from the overarm 105 and is configured and arranged, as is well known in the art, to connect to a mounting tube 186 of a fixture 180, which is described in more detail below.

The polisher 100 maintains rigid control of each polishing process through feedback mechanisms which control the operation of both the platen assembly 108 and the pneumatic overarm assembly 103. The feedback mechanisms communicate with the processor to continuously monitor the performance of the platen assembly 108 and the pneumatic overarm assembly 103 and ensure that both are functioning at their set levels. In some embodiments, the processor communicates with the porting device 110, the input device 112, and a USB port for a keyboard to enable rapid programming of the polisher 100. The input device 112 also serves as a visual indicator of actual operating parameters.

Figure 2:
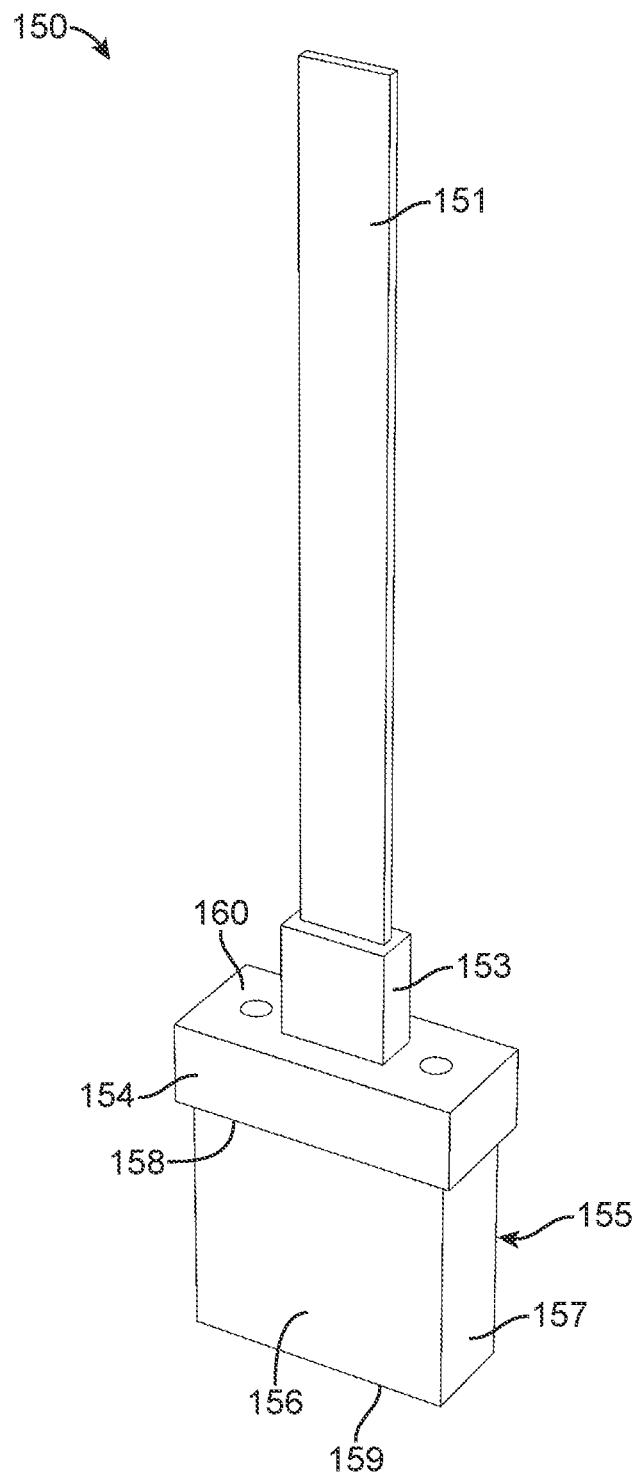
FIG. 2 is a top perspective view of a fiber optic cable assembly.
Figure 3:
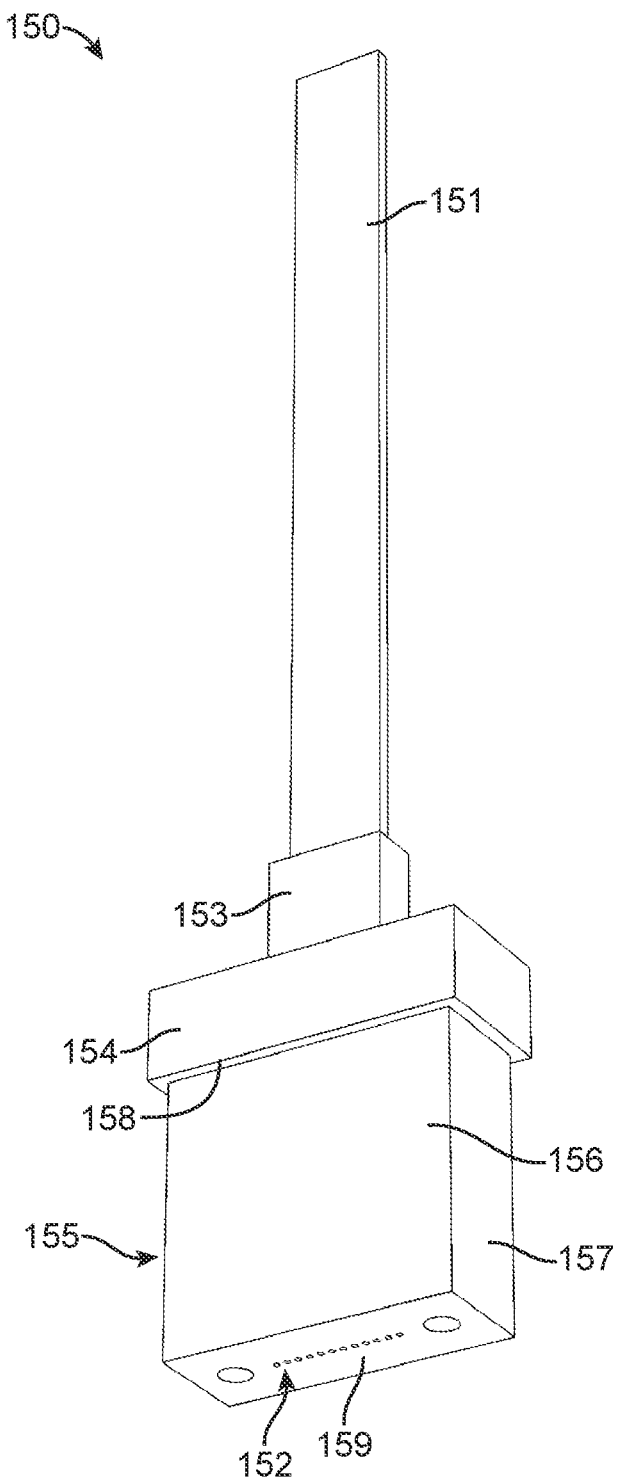
FIG. 3 is a bottom perspective view of the fiber optic cable assembly shown in FIG. 2.

FIGS. 2 and 3 are perspective views of an example fiber optic cable assembly 150, including a fiber cable 151. Although this type of assembly is shown and described, it is recognized that other suitable types of assemblies for use with any suitable non-round ferrules such as but not limited to MT ferrules, MTRJ ferrules, and fiber arrays. In some embodiments, a fixture could be adapted to receive one or more different types of assemblies. The fiber optic cable (MT ferrule) assembly 150 includes a ferrule 155 with a strain relief 153 and a fiber cable 151. The ferrule 155 has a shoulder 154, and fiber apertures 152 The fiber apertures 152 go through the ferrule 155 to allow the fiber in the fiber cable 151 to go through the ferrule and be polished coplanar to the ferrule end face 159. The shoulder 154 includes a top face 160 to which the strain relief 153 is attached. The ferrule 155 generally includes an end face 159 and four side faces 156 and 157. A shoulder bottom face 158 of the shoulder 154 is preferably manufactured substantially parallel with a ferrule end face 159 of the ferrule 155. Thus, according to some embodiments, the ferrule end face 159 may be squared within a fixture with reference to the shoulder bottom face 158.

Embodiments of the disclosure generally provide a toolless clamp that may be used to secure a connecting member, such as a fiber optic cable assembly, to a support structure, such as a fixture of an optical fiber polisher. A latch is configured and arranged to move a spring biased shaft, which moves a clamping member, from an unclamped position to a clamped position to secure the fiber optic cable assembly to the fixture.

In one embodiment, shown in FIGS. 4, 5, and 9-13B, a clamp assembly 200 includes a clamp base 201, a shaft 231, a biasing member 243, a latch 249, and a clamping member 267.

Figure 5:
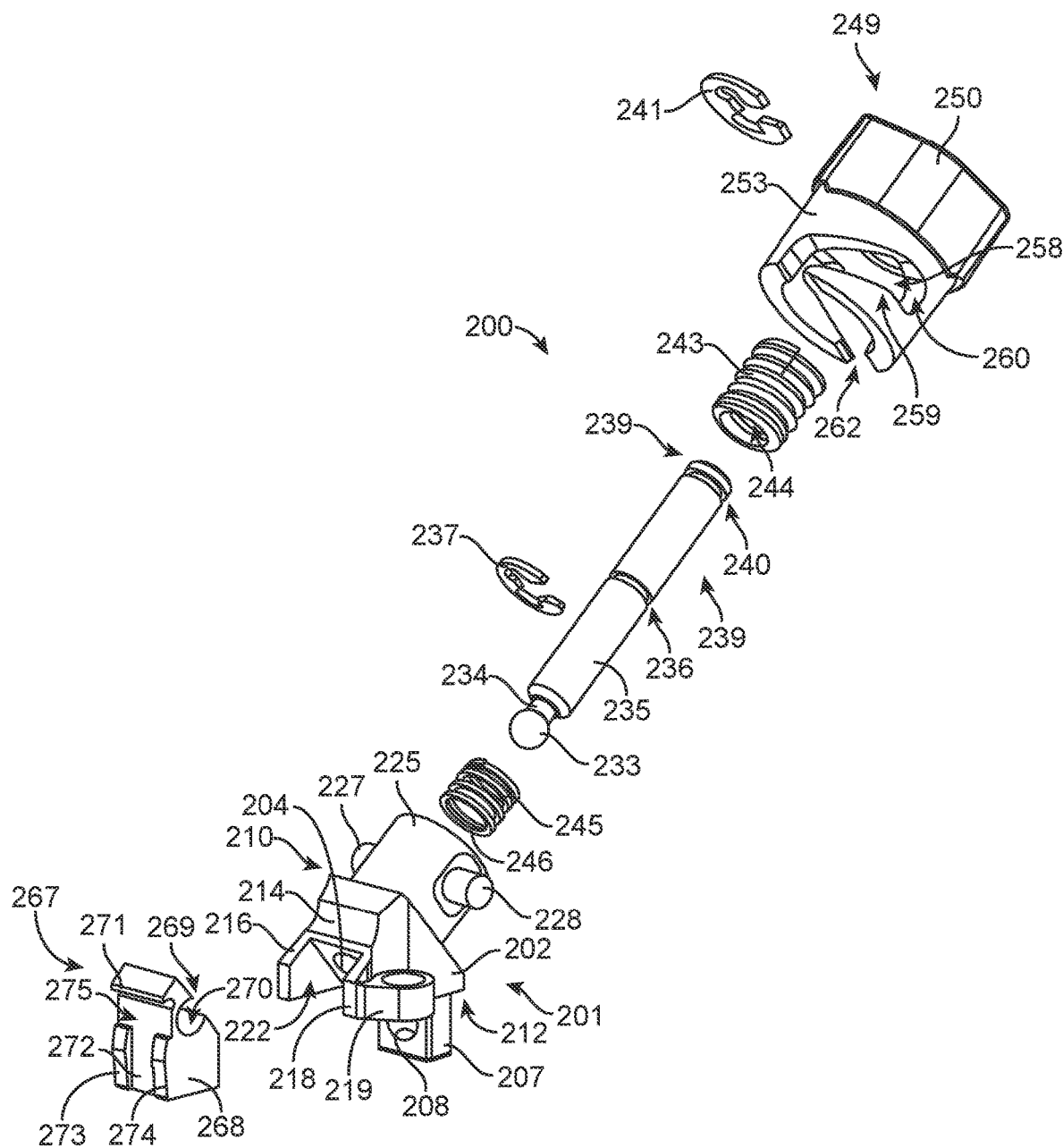
FIG. 5 is an exploded rear perspective view of the clamp assembly shown in FIG. 4.
Figure 6:
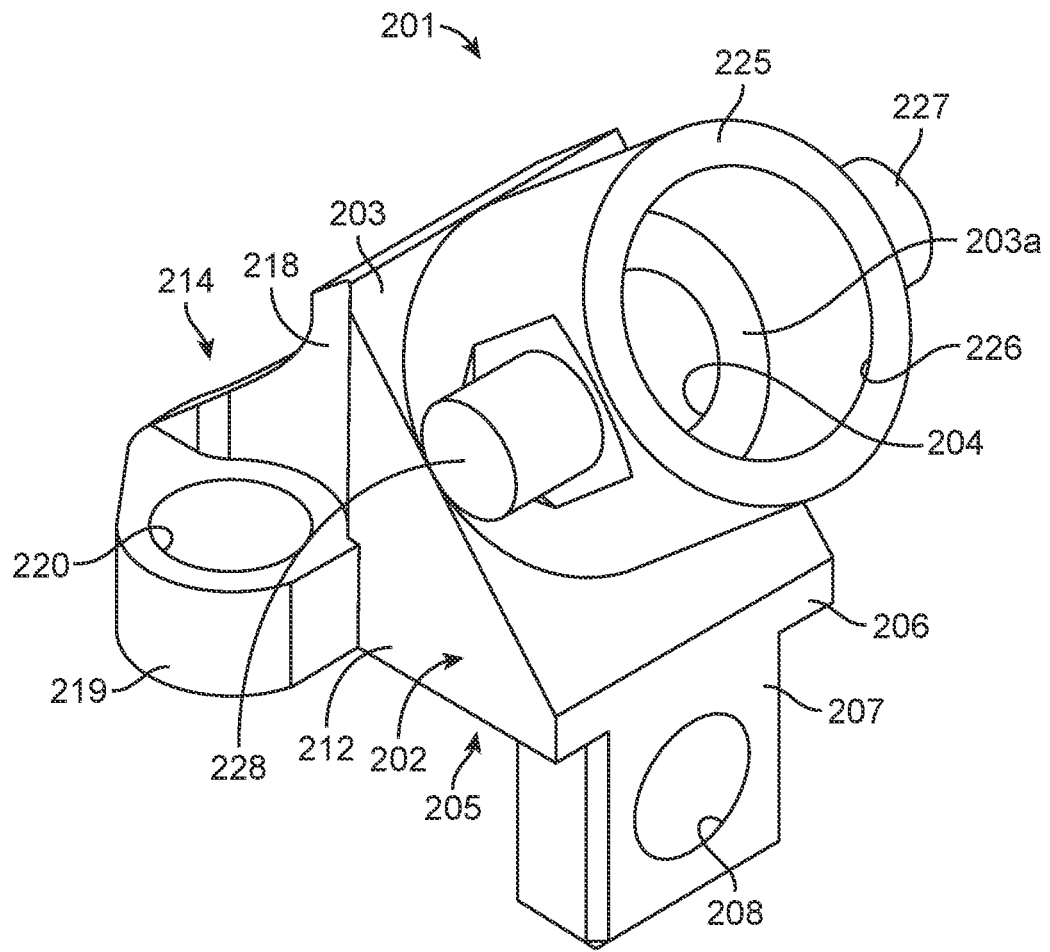
FIG. 6 is a front perspective view of a clamp base of the clamp assembly shown in FIG. 4.

The clamp base 201 is best shown in FIGS. 5 and 6. A base portion 202 includes a top 203, a bottom 205, a front 206, a first side 210, a second side 212, and a rear 214. The top 203 preferably extends downward at an angle of approximately 40 degrees from the rear 214 to the front 206. A bore 204 extends through the base portion 202 from the top 203 to the rear 214. The front 206 includes a front extension 207, which extends downward from proximate a juncture between the front 206 and the bottom 205 and includes an aperture 208. The rear 214 includes a first flange 216 extending outward from proximate the first side 210 and a second flange 218 extending outward from proximate the second side 212, and the flanges 216 and 218 form a cavity 222 therebetween. The second flange 218 includes a second flange extension 219 through which an aperture 220 extends. A cylindrical portion 225 including a bore 226 is operatively connected to the top 203 about the bore 204. The bore 226 is larger than the bore 204 thereby forming a ledge 203a on the top 203 proximate the juncture of the bores 204 and 226. A first pin 227 extends outward from a first side of the cylindrical portion 225 and a second pin 228 extends outward from a second side of the cylindrical portion 225.

Figure 7:
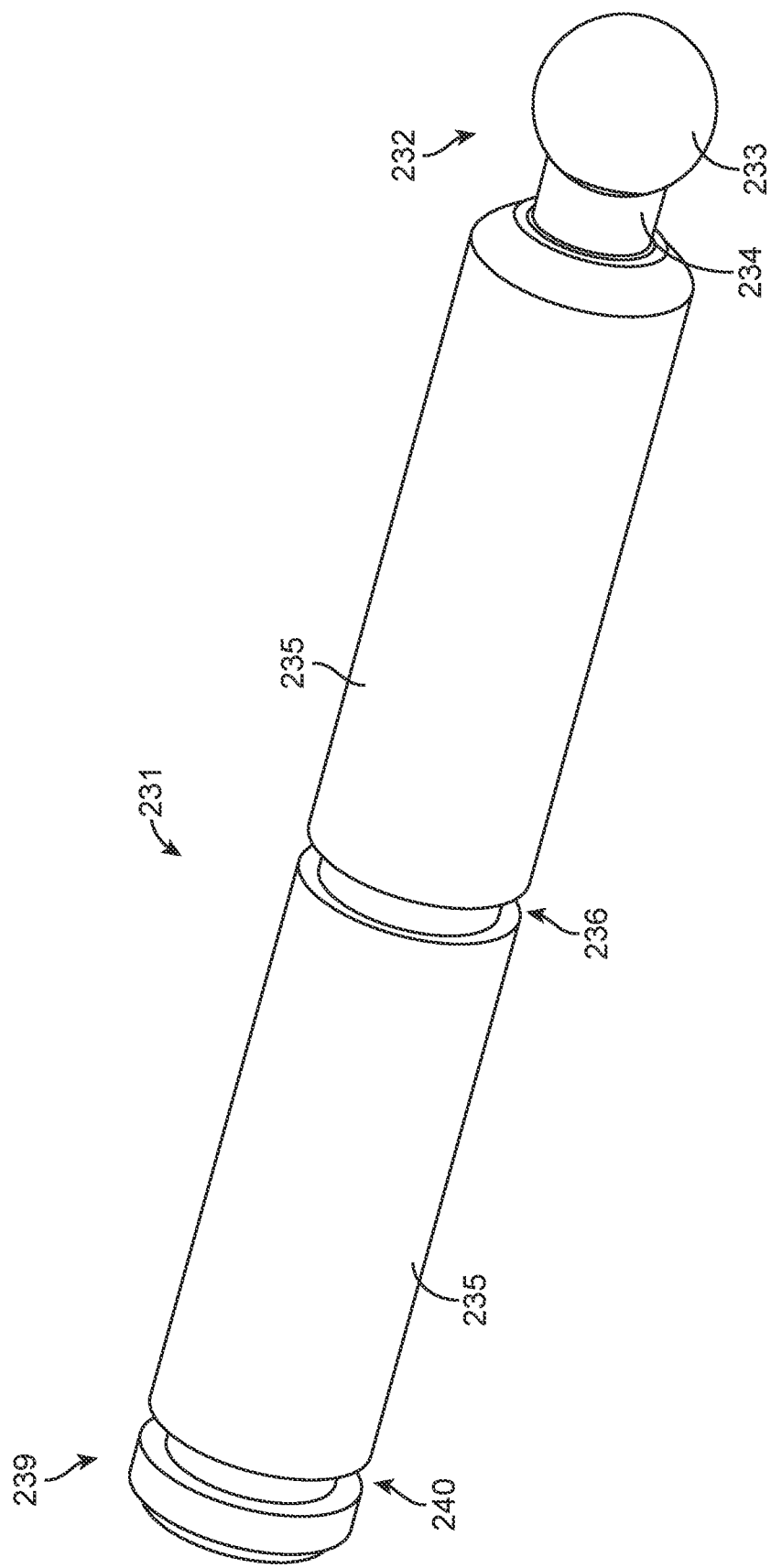
FIG. 7 is a perspective view of a shaft of the clamp assembly shown in FIG. 4.

The shaft 231 is best shown in FIG. 7. The shaft 231 includes a proximal end 232 with a neck 234 from which a spherical portion 233 extends. An intermediate portion 235 of the shaft 231 includes a notch 236 configured and arranged to receive an inner retaining member 237, and a distal end 239 includes a notch 240 configured and arranged to receive an outer retaining member 241. A biasing member 243, including bore 244, and an optional biasing member 245, including bore 246, are configured and arranged to receive the shaft 231.

Figure 8:
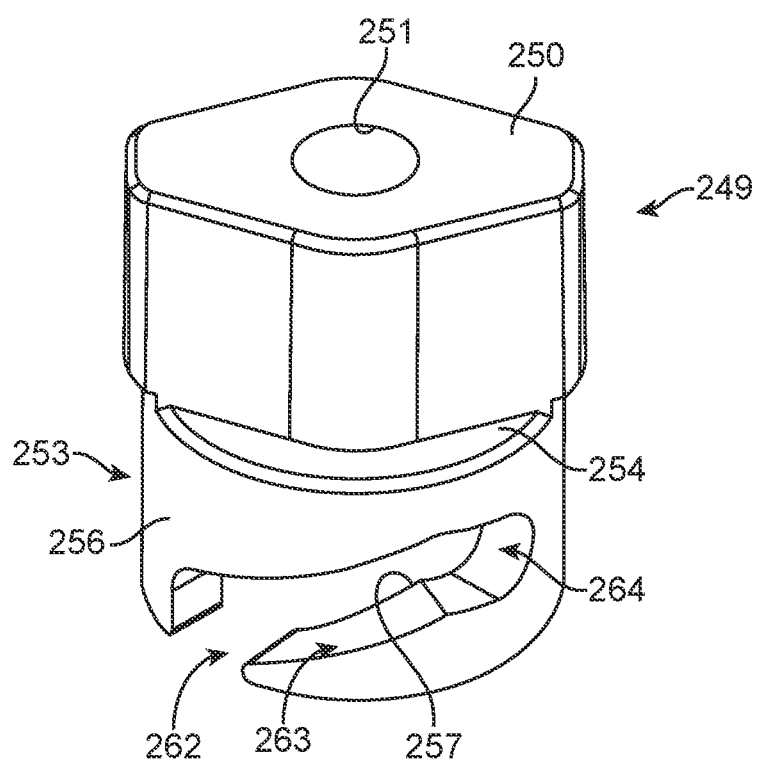
FIG. 8 is a perspective view of a latch of the clamp assembly shown in FIG. 4.

The latch 249 is best shown in FIG. 8. The latch 249 includes a knob 250 through which bores 251 and 252 extend. The bore 251 extends from proximate a top to proximate a middle portion of the knob 250, and the bore 252 extends from proximate the middle portion to proximate a bottom of the knob 250. The bore 252 has a larger diameter than the bore 251 thereby forming an upper ledge 252a. A cylindrical portion 253 extends downward and outward from the knob 250 to form a top 254 and a side 256 through which a bore 257 extends. The bore 257 has a larger diameter than the bore 252 thereby forming a lower ledge 257a. The side 256 includes opposing channels, a first channel 258 and a second channel 262. The first channel 258 includes a ramp portion 259 and a stop portion 260, and the second channel 262 includes a ramp portion 263 and a stop portion 264.

Figure 4:
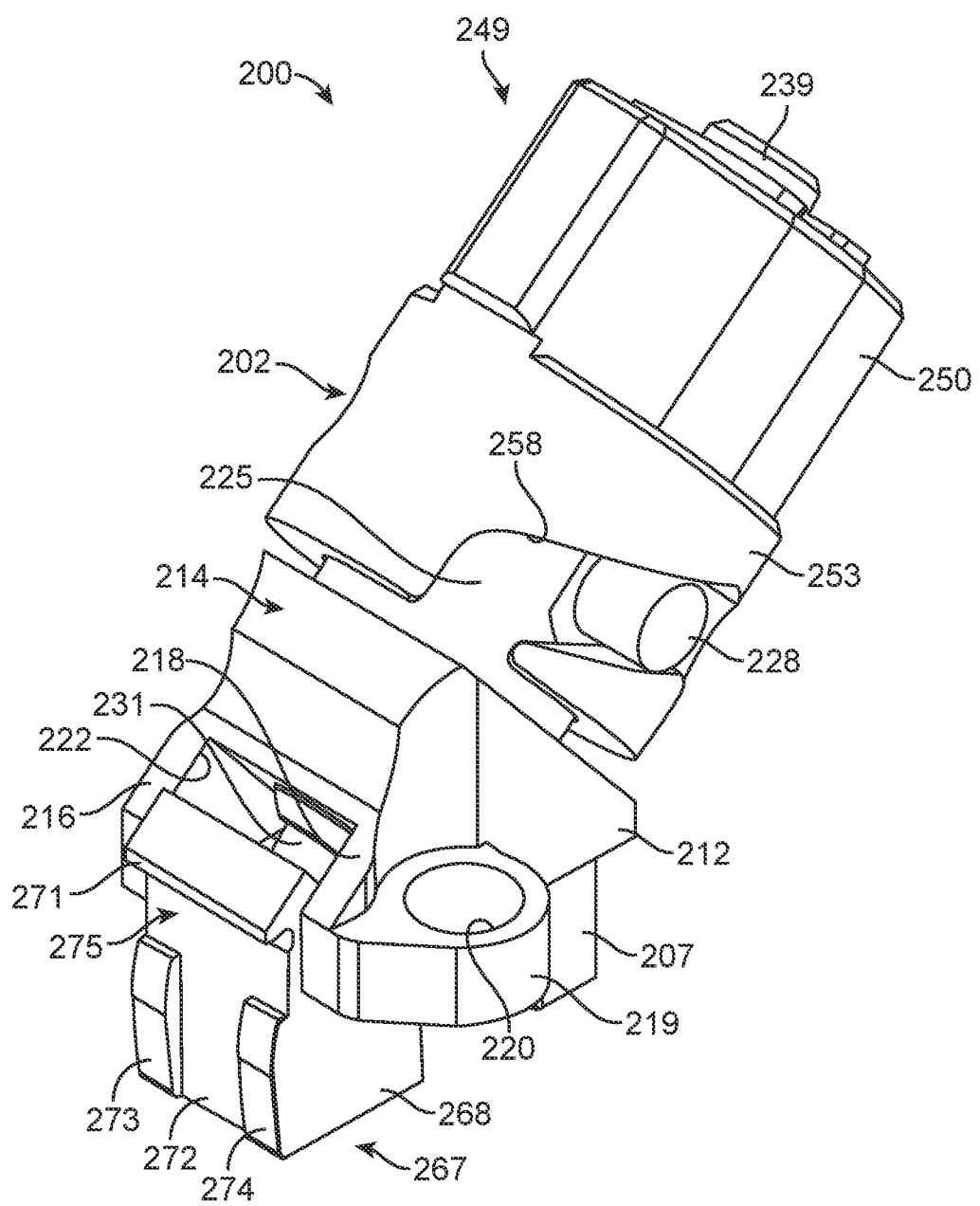
FIG. 4 is a rear perspective view of an embodiment clamp assembly constructed in accordance with the principles of the present invention.

The clamping member 267 is best shown in FIGS. 4 and 5. The clamping member 267 includes a base portion 268 having a rear 272 proximate which a top portion 269 extends upward and from which bumpers extend outward. The top portion 269 forms a slot 270 proximate the front and a lip 271 extending outward proximate the rear 272. The lip 271 and the first and second bumpers 273 and 274 form a cavity 275.

To assemble the clamp assembly 200, the spherical portion 233 of the shaft 231 is slid into the slot 270 of the clamping member 267. The distal end 239 of the shaft 231 is inserted through the bores 204 and 226 of the clamp base 201 and the clamping member 267 is positioned within the cavity 222 of the clamp base 201. The optional biasing member 245 is positioned about the shaft 231 between the notch 236 and the ledge 203a, and the inner retaining member 237 is positioned within the notch 236 to retain the optional biasing member 245. The biasing member 243 is positioned about the shaft 231 between the inner retaining member 237 and the distal end 239. Then the distal end 239 of the shaft 231 is inserted through the bores 257, 252 and 251 of the latch 249 so that the biasing member 243 is positioned between the upper ledge 252a and the inner retaining member 237. The pins 227 and 228 of the clamp base 201 extend through the respective channels 258 and 262 of the latch 249. The outer retaining member 241 is positioned within the notch 240 to retain the latch 249.

To secure the clamp assembly 200 to the base 181 of the fixture 180, a portion of the clamping member 267 is positioned within a cavity 183 of the fixture base 181 and front extension 207 is positioned within a cavity 185 of the fixture base 181, a fastener 277 is inserted through the aperture 208 of the clamp base 201 and into a bore 184 of the fixture base 181, and a fastener 278 is inserted through the aperture 220 of the clamp base 201 and into a bore (not shown) of the fixture base 181. The cavity 183 is configured and arranged to allow the clamping member 267 to move therein to engage and disengage the shoulder 154 of the fiber optic cable assembly 150, which is inserted into an aperture 182 in the fixture base 181. It is recognized that this clamp assembly 200 could be used with any suitable connecting member.

Figure 9:
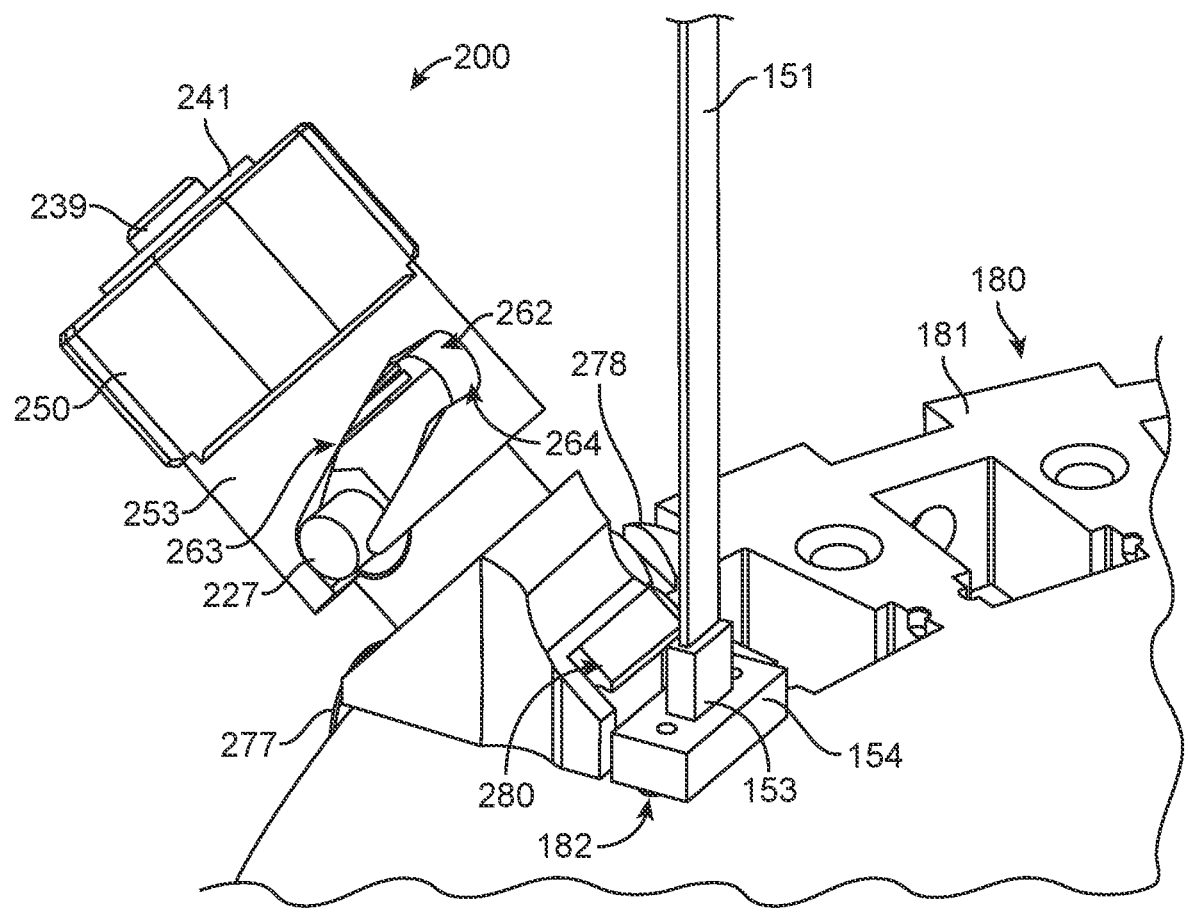
FIG. 9 is a top perspective view of the clamp assembly shown in FIG. 4 and a fiber optic cable assembly connected to a fixture of an optical fiber polisher with the clamp assembly in an unclamped position.
Figure 10A:
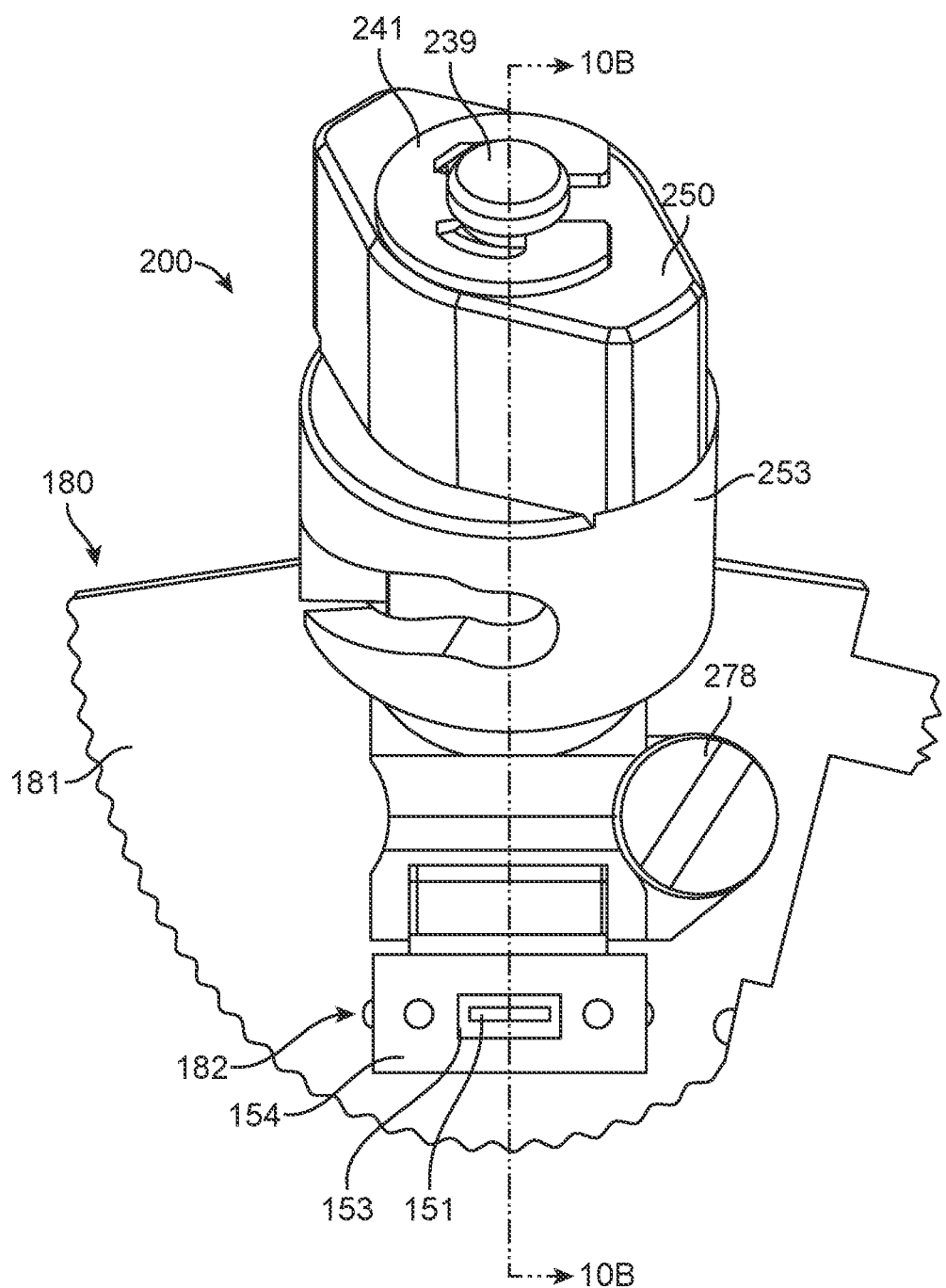
FIG. 10A is a top perspective view of the clamp assembly, fiber optic cable assembly, and fixture shown in FIG. 9.
Figure 10B:
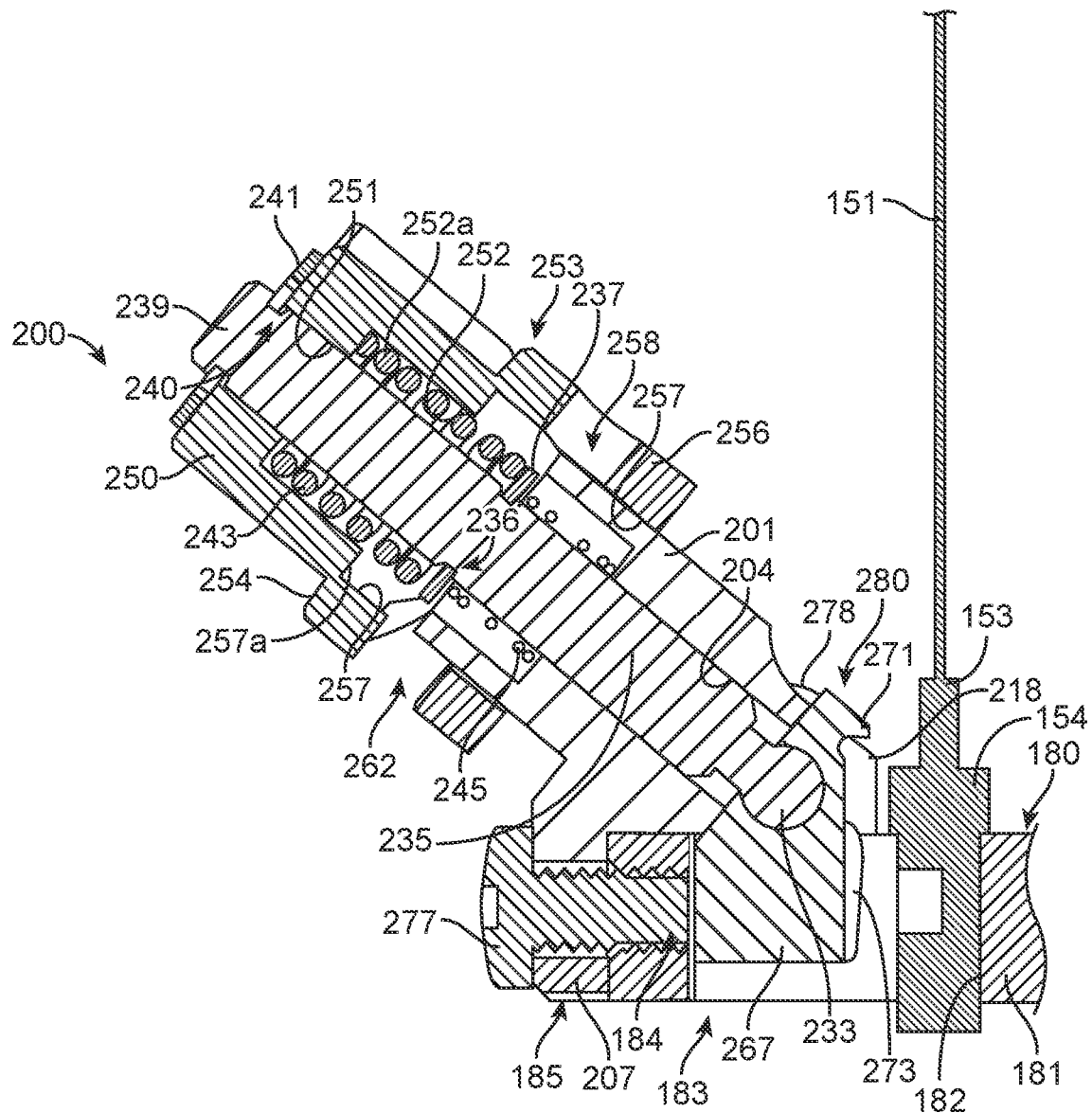
FIG. 10B is a cross-section view of the clamp assembly, fiber optic cable assembly, and fixture shown in FIG. 10A taken along the lines 10B-10B in FIG. 10A.
Figure 11:
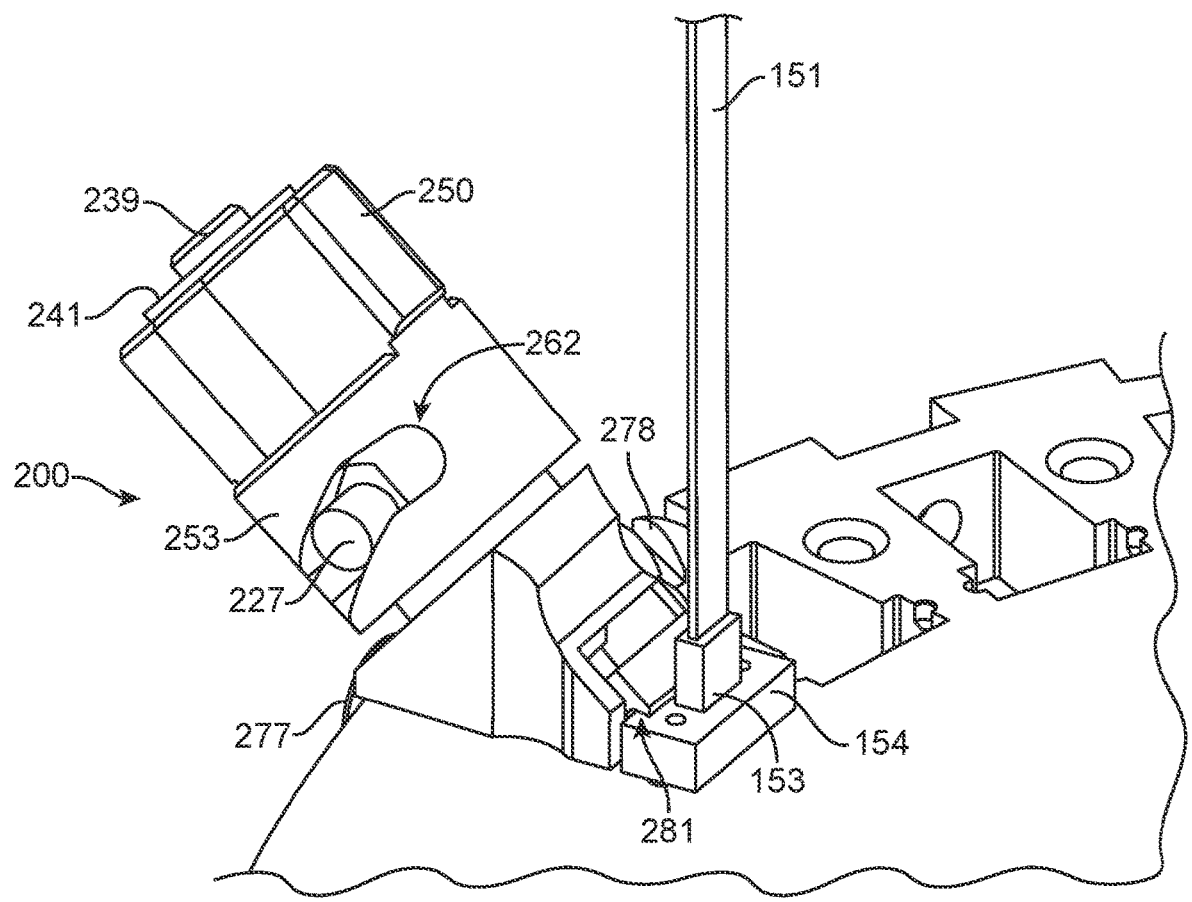
FIG. 11 is a perspective view of the clamp assembly and the fiber optic cable assembly connected to the fixture shown in FIG. 9 with the clamp assembly in an intermediate position.

In operation, when the clamp assembly 200 is positioned in an unclamped position 280, with the pins 227 and 228 of the clamp base 201 positioned in the openings or lower portions of the channels 258 and 262 of the latch 249, best shown in FIGS. 9, 10A, and 10B, the biasing member 245 bias the shaft 231 and the clamping member 267 in an upward position. The clamping member 267 contacts the clamp base 201 to prevent the shaft 231 from moving out of the clamp base 201, and the inner retaining member 237 acts as a stop for the biasing member 245. The biasing member 243 is held in a compressed state between the inner retaining member 237 and the latch 249. The outer retaining member 241 acts as a stop for the latch 249. As the latch 249 is rotated about the clamp base 201, the pins 227 and 228 move along the respective ramp portions 259 and 263 and the biasing member 245 is compressed by the inner retaining member 237 in an intermediate position 281, which positions the clamping member 267 to engage the connecting member, best shown in FIG. 11. When the pins 227 and 228 are positioned in the respective stop portions 260 and 264, biasing member 243 is compressed, and the clamp assembly 200 is positioned in a clamped position 282, best shown in FIGS. 12, 13A, and 13B. The biasing member 243 biases the shaft 231 in a downward position, which transfers the force of the biasing member 243 from the outer retaining member 241 to the clamping member 267 to engage the connecting member, which in this example is a shoulder 154 of a fiber optic cable assembly 150. If the inner retaining member 237 and the biasing member 245 were eliminated, the biasing member 243 would exert a biasing force against the base 201 and the biasing member 243 would be compressing during the entire rotation of the latch 249, causing more strain on the operator and the clamp assembly components. Therefore, the inner retaining member 237 is optional but preferred.

Figure 12:
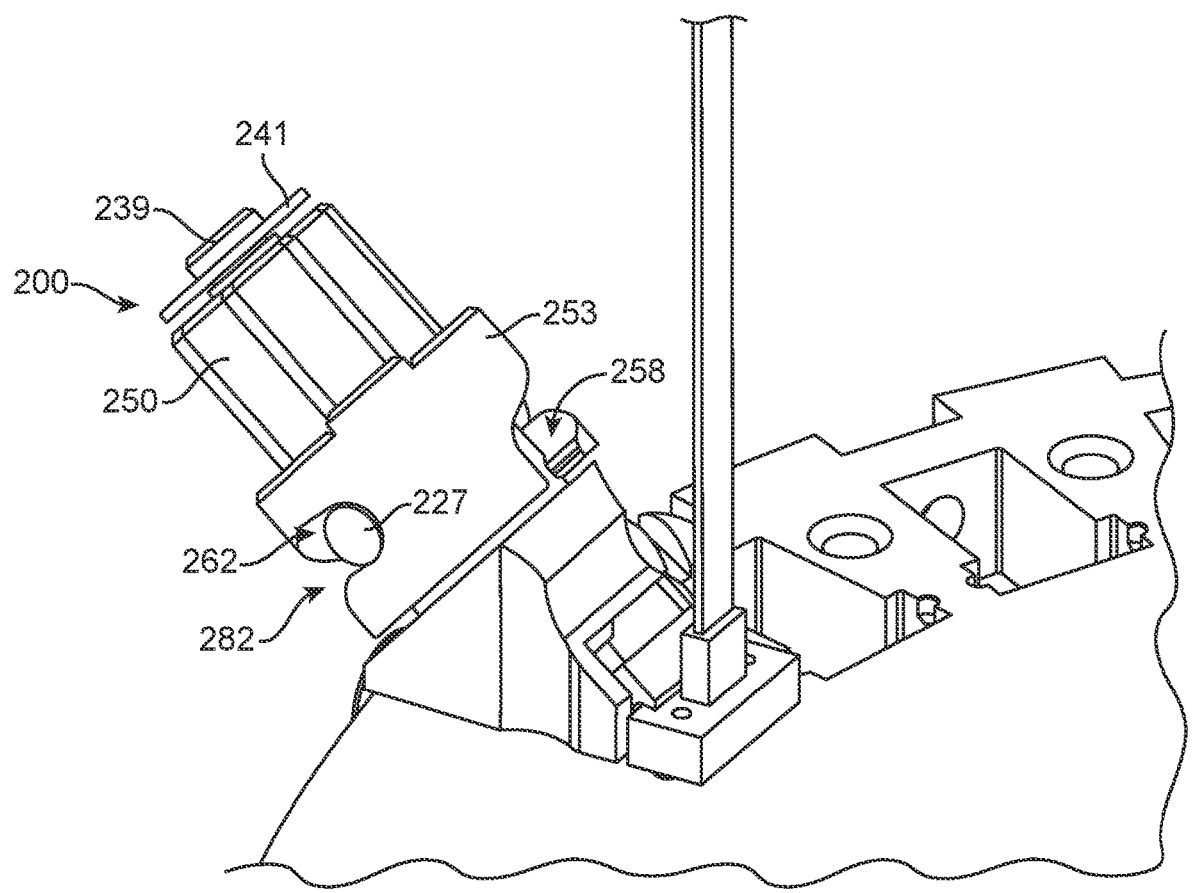
FIG. 12 is a perspective view of the clamp assembly and the fiber optic cable assembly connected to the fixture shown in FIG. 9 with the clamp assembly in a clamped position.
Figure 13A:
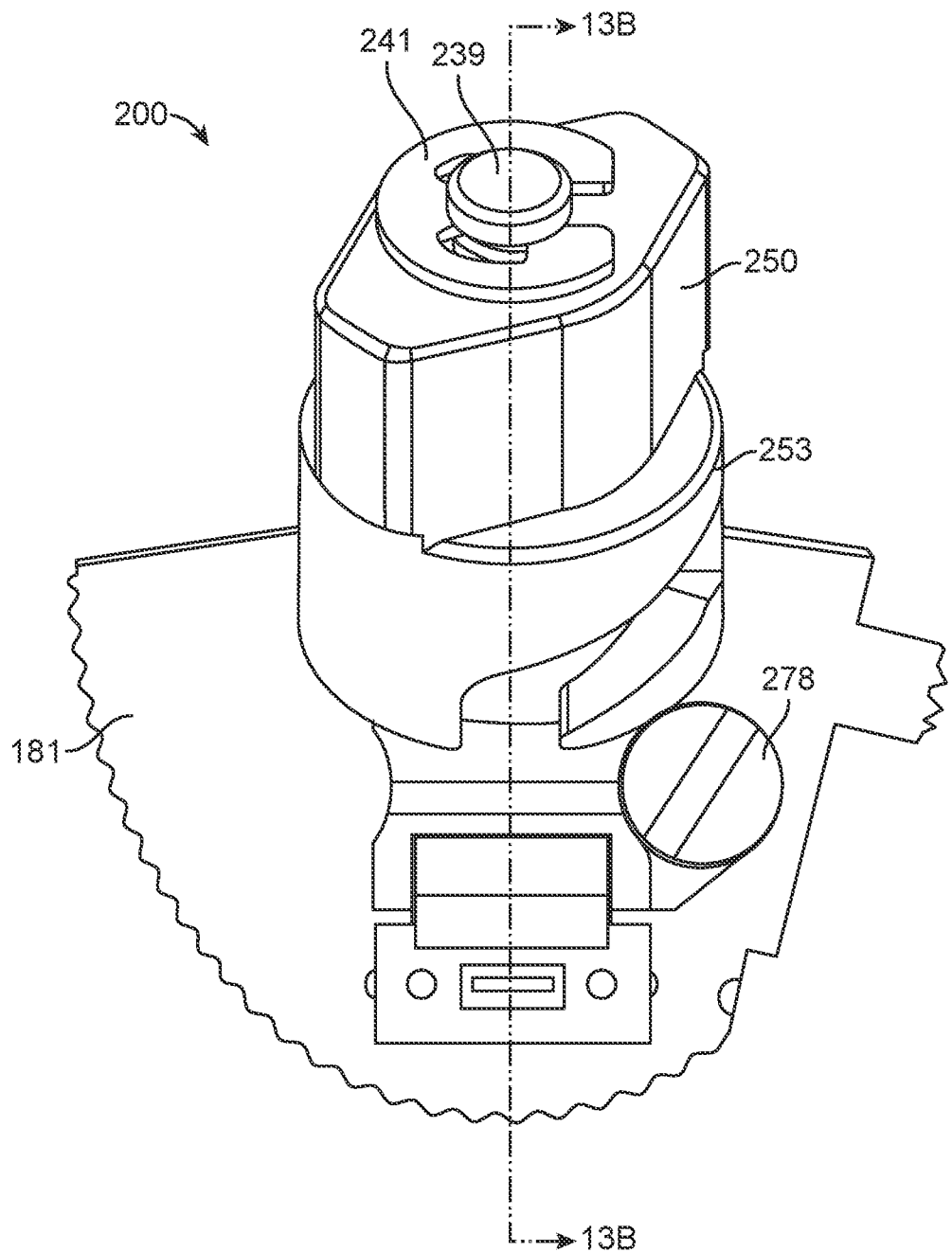
FIG. 13A is a top perspective view of the clamp assembly, fiber optic cable assembly, and fixture shown in FIG. 12.
Figure 13B:
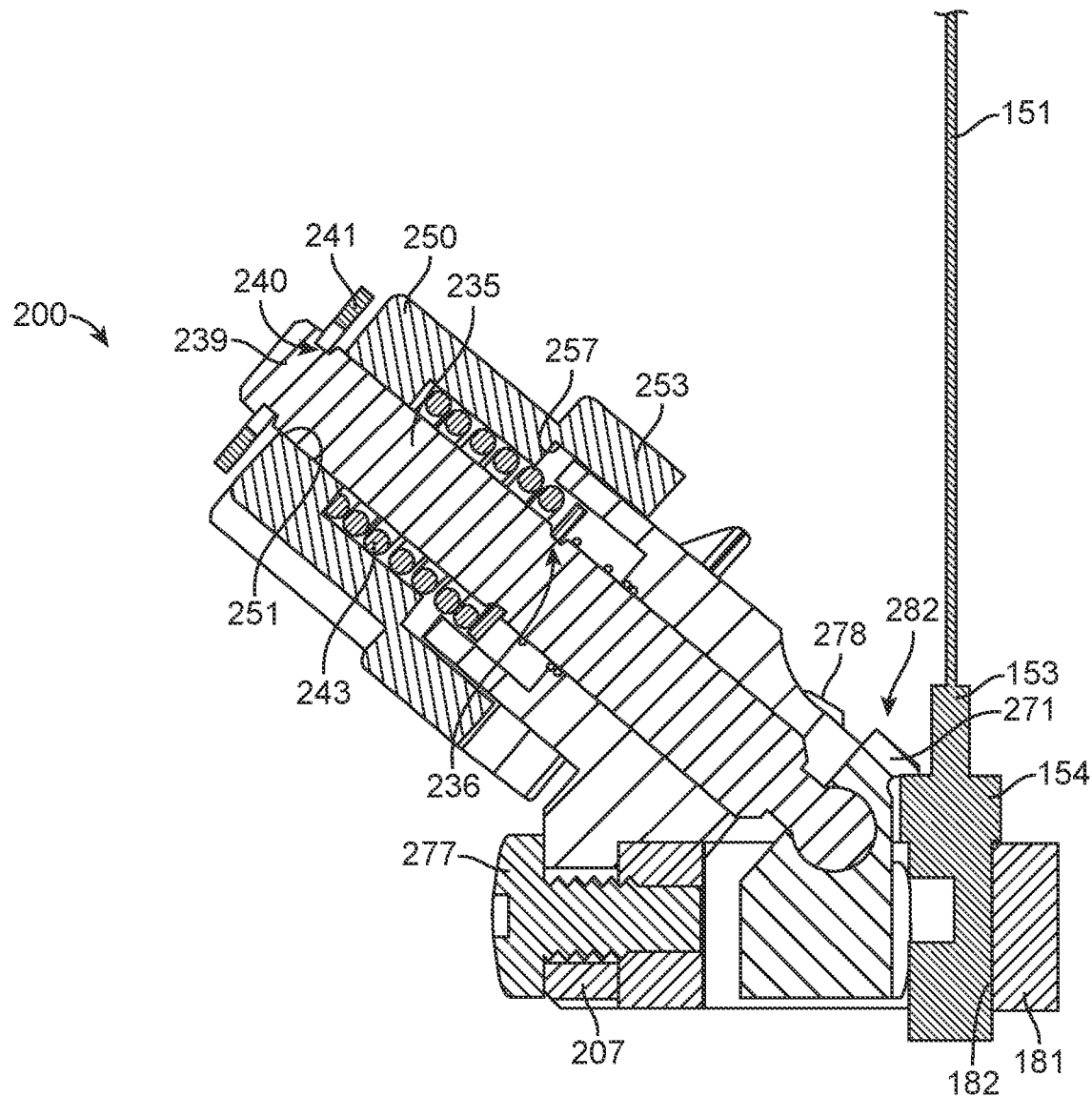
FIG. 13B is a cross-section view of the clamp assembly, fiber optic cable assembly, and fixture shown in FIG. 13A taken along the lines 13B-13B in FIG. 13A.

In the unclamped position 280, the biasing member 245 exerts an upward biasing force on the shaft 231 by way of the inner retaining member 237. The biasing member 243 exerts a biasing force on the latch 249 contained on the shaft 231 between the outer retaining member 241 and the inner retaining member 237. In the intermediate position 281, the biasing member 245 is being compressed. In the clamped position 282, the latch 249 is locked into place relative to the clamp base 201 and the latch 249 compresses the biasing members 243, which transfers the downward biasing force of the biasing member 243 to the clamping member 267 and the fiber optic cable assembly 150. Therefore, when the clamp assembly 200 is moved from the unclamped position 280 into the clamped position 282, the biasing force is transferred from an upward biasing force to a downward biasing force. FIGS. 12, 13A, and 13B illustrate a gap between the latch 249 and the outer retaining member 241 because of the transfer of the biasing force.

As the latch 249 is rotated, the downward biasing force is not applied until the clamping member 267 is seated on the connecting member, when the last part of the rotation into the stop portions 260 and 264 transfers the biasing force from the outer retaining member 241 to the connecting member. The biasing member 243 is captured between the inner retaining member 237 and the latch 249, which is held by the outer retaining member 241. There is approximately 8 to 9 pounds of preload on the biasing member 243 shown in this example, but it is recognized that there may be other biasing options that can get exceed 12 pounds if desired.

In one embodiment, shown in FIGS. 14-18B, a clamp assembly 300 includes a clamp base 301, a shaft 331, a biasing member 343, a latch 349, and a clamping member 367.

The clamp base 301 has a base portion 302 including a top 303, a front 306, a first side 310, a second side 312, and a rear 314. The top 303 preferably extends downward at an angle of approximately 40 degrees from the rear 314 to the front 306. A bore 304 extends through the base portion 302 from the top 303 to the rear 314. The front 306 includes a front extension 307, which extends downward from proximate a juncture between the front 306 and the bottom and includes an aperture 308. The rear 314 includes a first flange 316 extending outward from proximate the first side 310 and a second flange 318 extending outward from proximate the second side 312, and the flanges 316 and 318 form a cavity 322 therebetween. The second flange 318 includes a second flange extension 319 through which an aperture (not shown) extends. A cylindrical portion 325 including a bore 326 is operatively connected to the top 303 about the bore 304. The bore 326 is larger than the bore 304 thereby forming a ledge 303a on the top 303 proximate the juncture of the bores 304 and 326. A first pin 327 extends outward from a first side of the cylindrical portion 325 and a second pin (not shown) extends outward from a second side of the cylindrical portion 325.

Figure 15A:
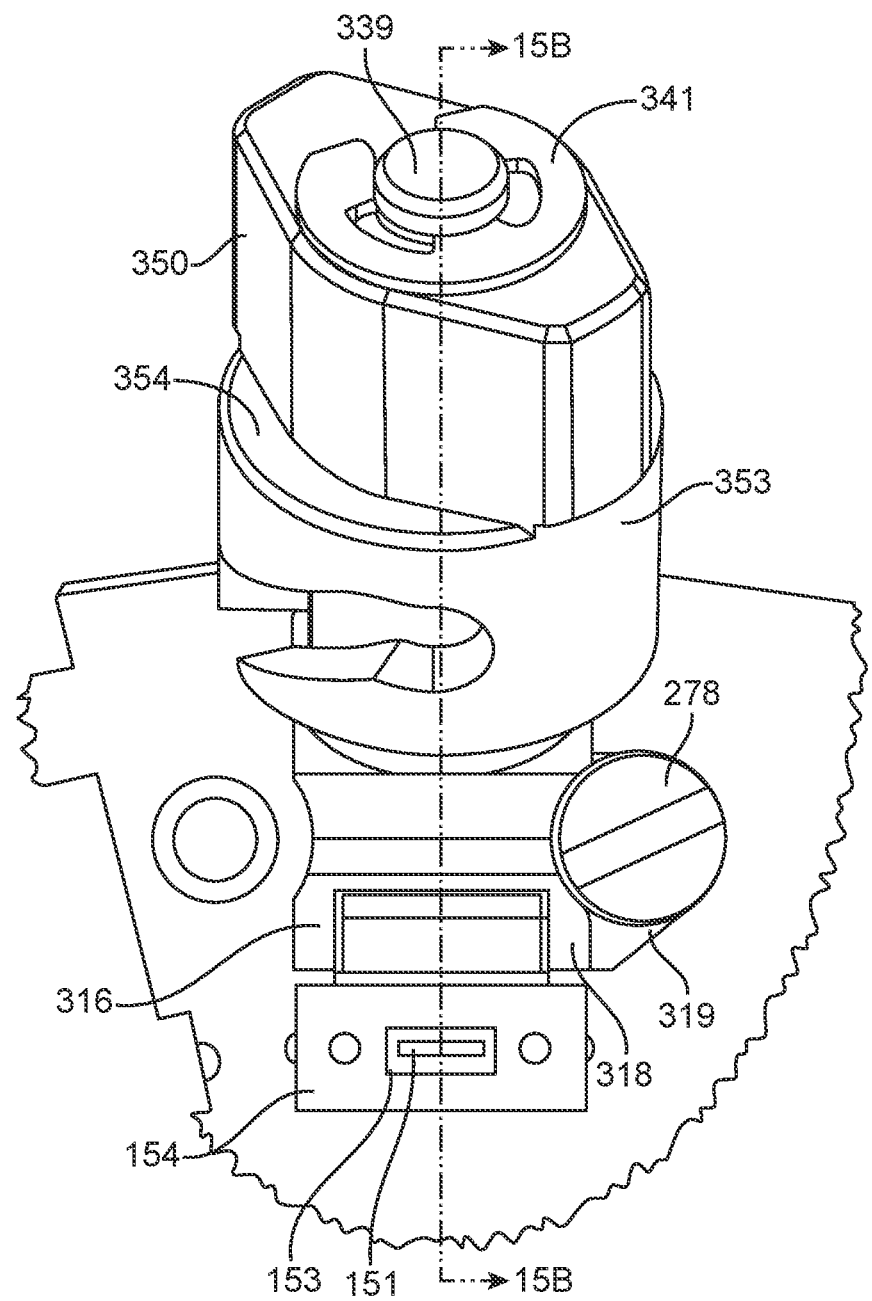
FIG. 15A is a top perspective view of the clamp assembly, fiber optic cable assembly, and fixture shown in FIG. 14.
Figure 15B:
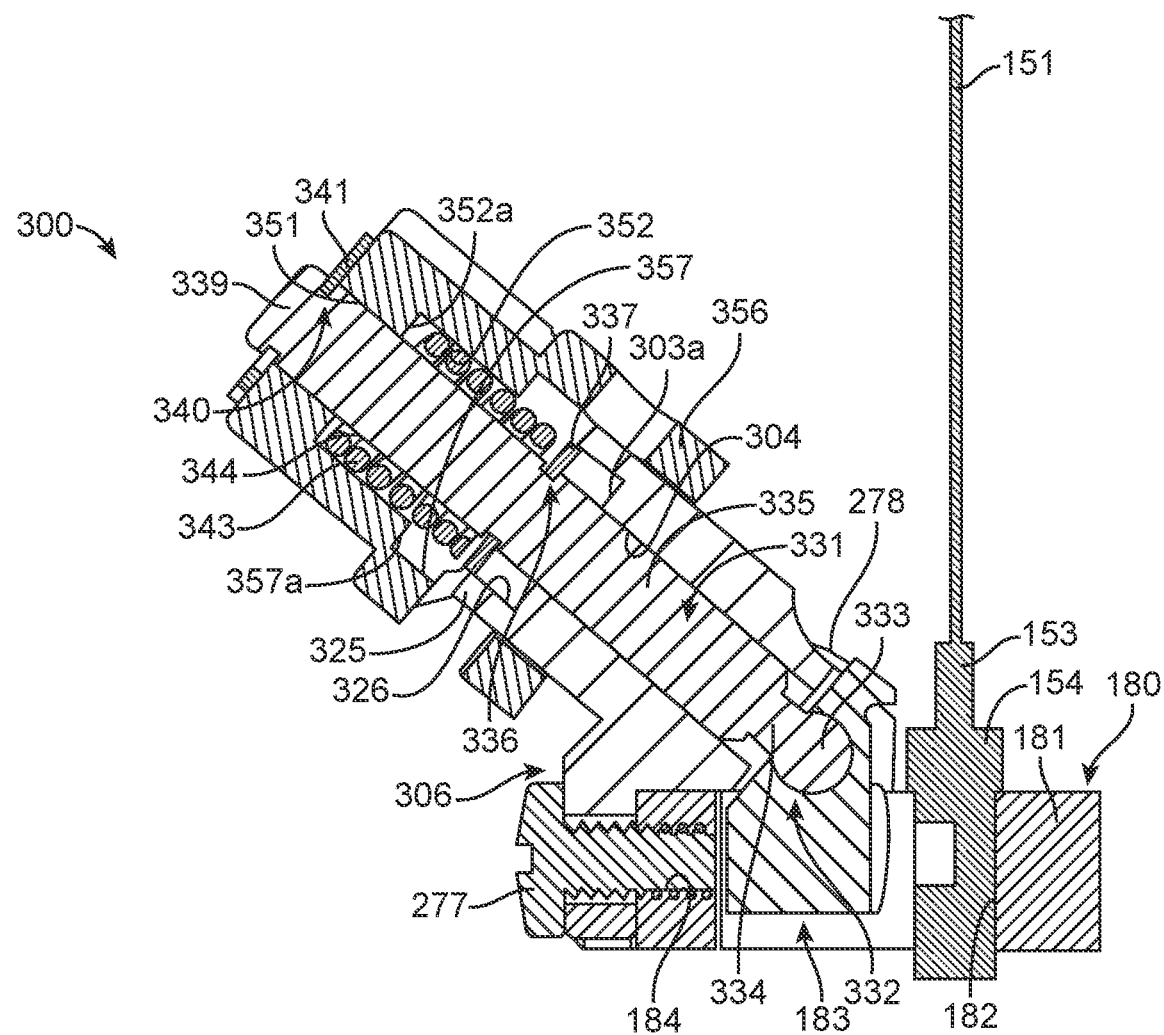
FIG. 15B is a cross-section view of the clamp assembly, fiber optic cable assembly, and fixture shown in FIG. 15A taken along the lines 15B-15B in FIG. 15A.
Figure 16:
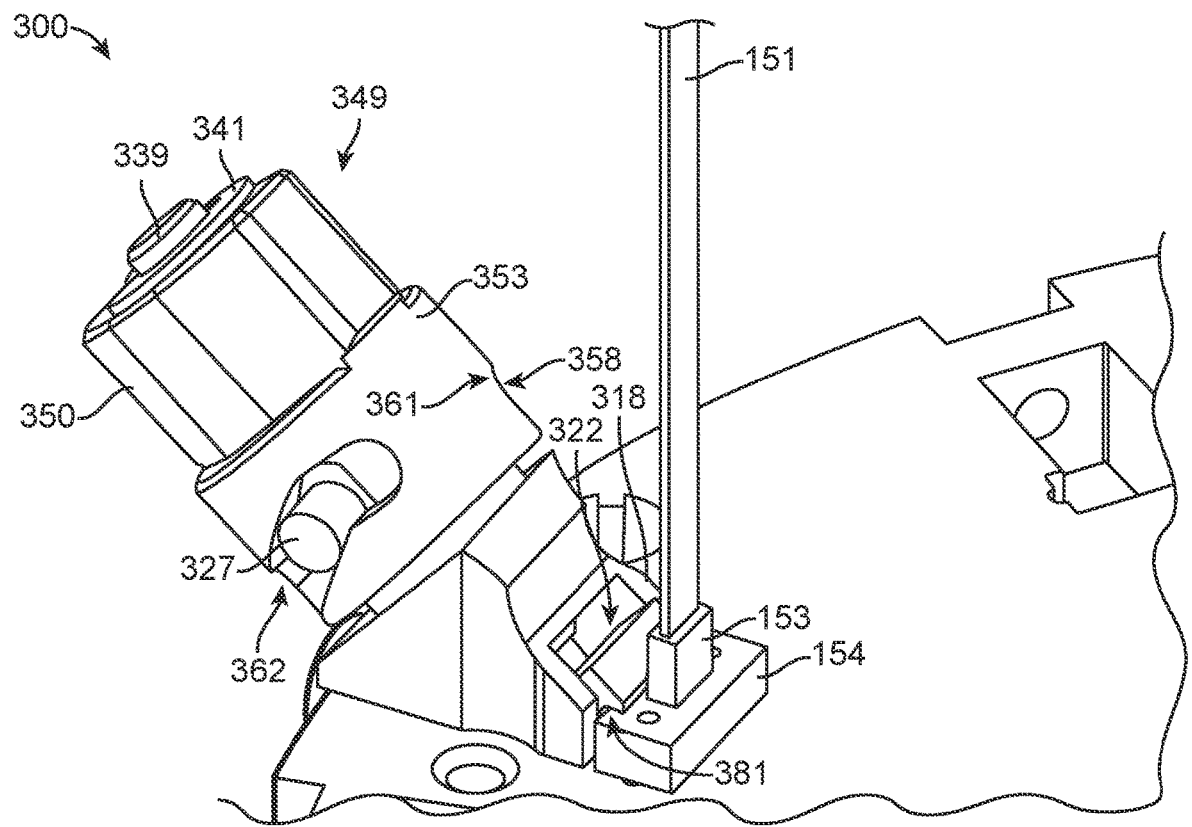
FIG. 16 is a perspective view of the clamp assembly and the fiber optic cable assembly connected to the fixture shown in FIG. 14 with the clamp assembly in an intermediate position.
Figure 18A:
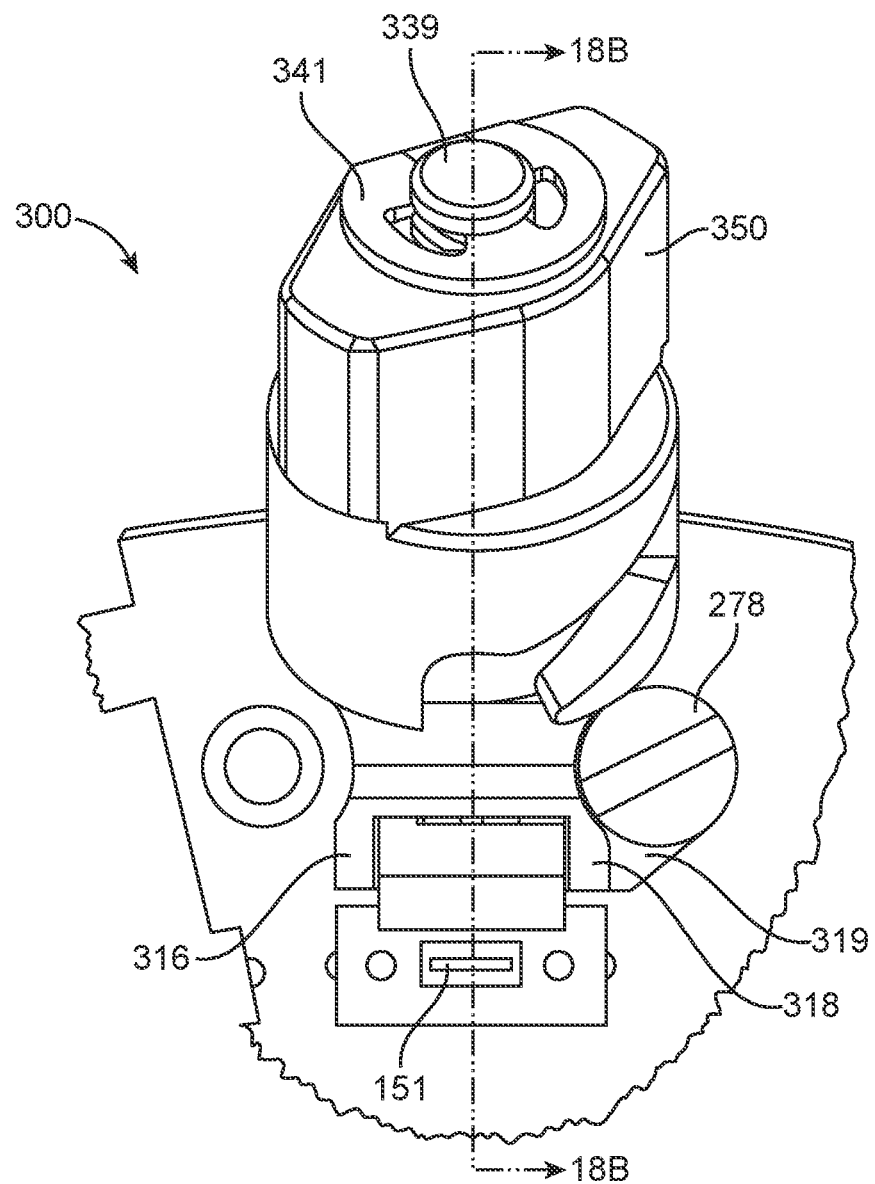
FIG. 18A is a top perspective view of the clamp assembly, fiber optic cable assembly, and fixture shown in FIG. 17.
Figure 18B:
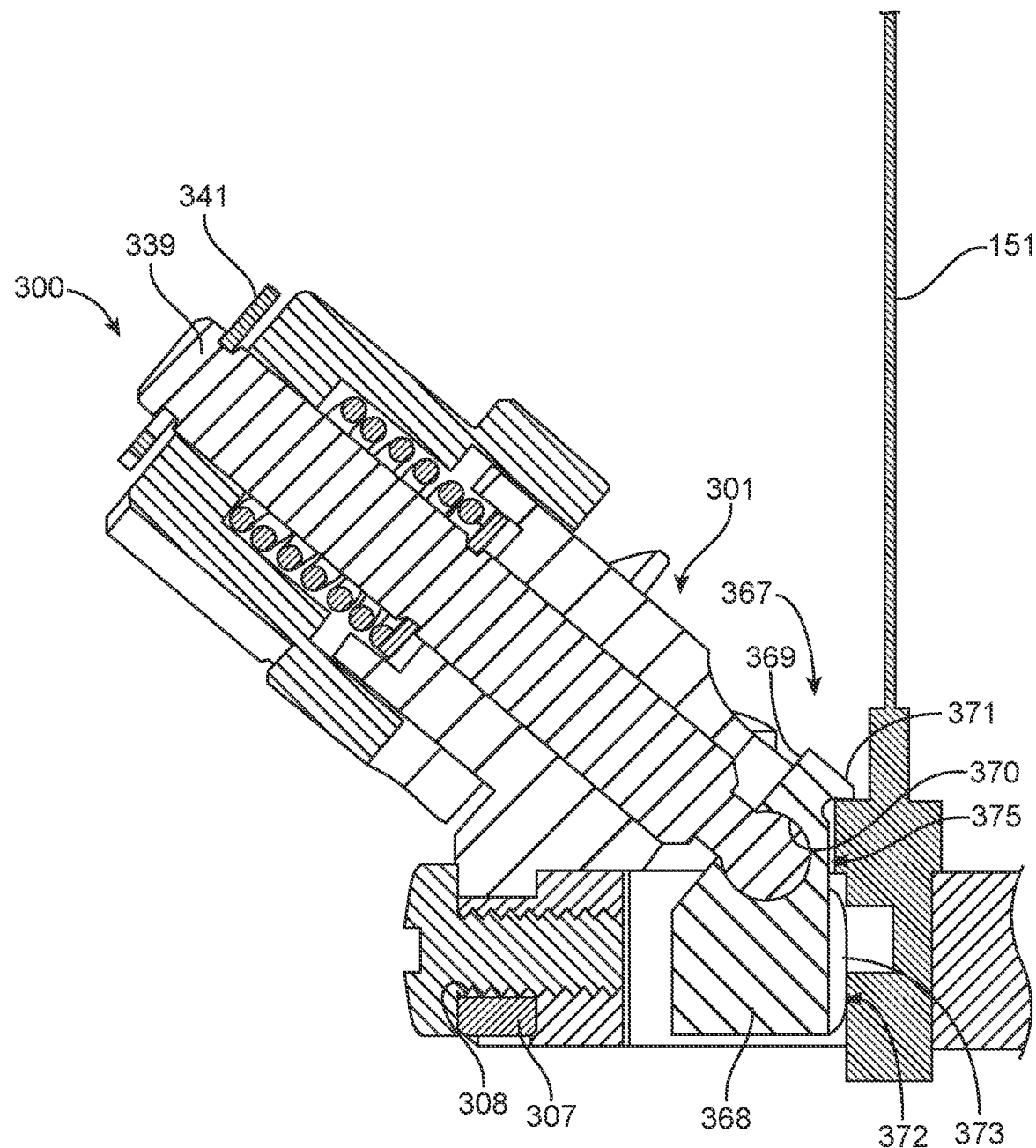
FIG. 18B is a cross-section view of the clamp assembly, fiber optic cable assembly, and fixture shown in FIG. 18A taken along the lines 18B-18B in FIG. 18A.
Figure 19:
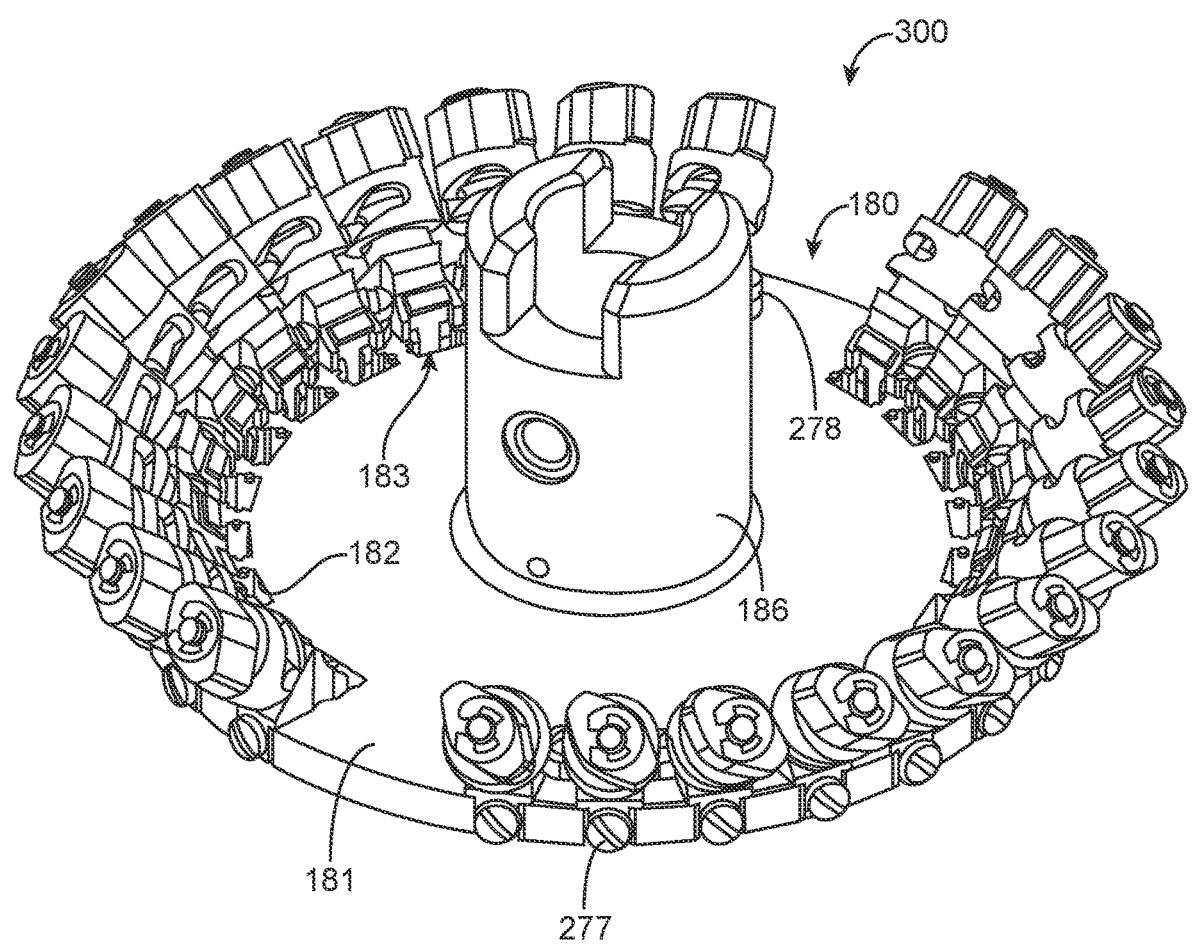
FIG. 19 is a perspective view of a plurality of clamp assemblies of the type shown in FIG. 14 connected to a fixture of an optical fiber polisher, the clamp assemblies positioned in unclamped positions.

The shaft 331, best shown in FIGS. 15B and 18B, includes a proximal end 332 with a neck 334 from which a spherical portion 333 extends. An intermediate portion 335 of the shaft 331 includes a notch 336 configured and arranged to receive an inner retaining member 337, and a distal end 339 includes a notch 340 configured and arranged to receive an outer retaining member 341. A biasing member 343, including bore 344, is configured and arranged to receive the shaft 331.

The latch 349 includes a knob 350 through which bores 351 and 352 extend. The bore 351 extends from proximate a top to proximate a middle portion of the knob 350, and the bore 352 extends from proximate the middle portion to proximate a bottom of the knob 350. The bore 352 has a larger diameter than the bore 351 thereby forming an upper ledge 352a. A cylindrical portion 353 extends downward and outward from the knob 350 to form a top 354 and a side 356 through which a bore 357 extends. The bore 357 has a larger diameter than the bore 352 thereby forming a lower ledge 357a. The side 356 includes opposing channels, a first channel 358 and a second channel 362. The first channel 358 includes a first detent latch portion 361, a ramp portion 359 and a stop portion (not shown), and the second channel 362 includes a second detent latch portion 365, a ramp portion 363 and a stop portion 364.

The clamping member 367 includes a base portion 368 having a rear 372 proximate which a top portion 369 extends upward and from which bumpers extend outward. The top portion 369 forms a slot 370 proximate the front and a lip 371 extending outward proximate the rear 372. The lip 371, the first bumper 373, and the second bumper (not shown) form a cavity 375.

To assemble the clamp assembly 300, the spherical portion 333 of the shaft 331 is slid into the slot 370 of the clamping member 367. The distal end 339 of the shaft 331 is inserted through the bores 304 and 326 of the clamp base 301 and the clamping member 367 is positioned within the cavity 322 of the clamp base 301. The inner retaining member 337 is positioned within the notch 336, and the biasing member 343 is positioned about the shaft 331 between the inner retaining member 337 and the distal end 339. Then the distal end 339 of the shaft 331 is inserted through the bores 357, 352 and 351 of the latch 349 so that the biasing member 343 is positioned between the upper ledge 352a and the inner retaining member 337. The pins 327 and 328 of the clamp base 301 extend through the respective channels 358 and 362 of the latch 349. The outer retaining member 341 is positioned within the notch 340 to retain the latch 349

To secure the clamp assembly 300 to the base 181 of the fixture 180, a portion of the clamping member 367 is positioned within a cavity 183 of the fixture base 181 and front extension 307 is positioned within cavity 185 of the fixture base 181, a fastener 277 is inserted through the aperture 308 of the clamp base 301 and into a bore 184 of the fixture base 181, and a fastener 278 is inserted through the aperture (not shown) of the clamp base 301 and into a bore (not shown) of the fixture base 181. The cavity 183 is configured and arranged to allow the clamping member 367 to move therein to engage and disengage the shoulder 154 of the fiber optic cable assembly 150, which is inserted into an aperture 182 in the fixture base 181. It is recognized that this clamp assembly 300 could be used with any suitable connecting member.

Figure 14:
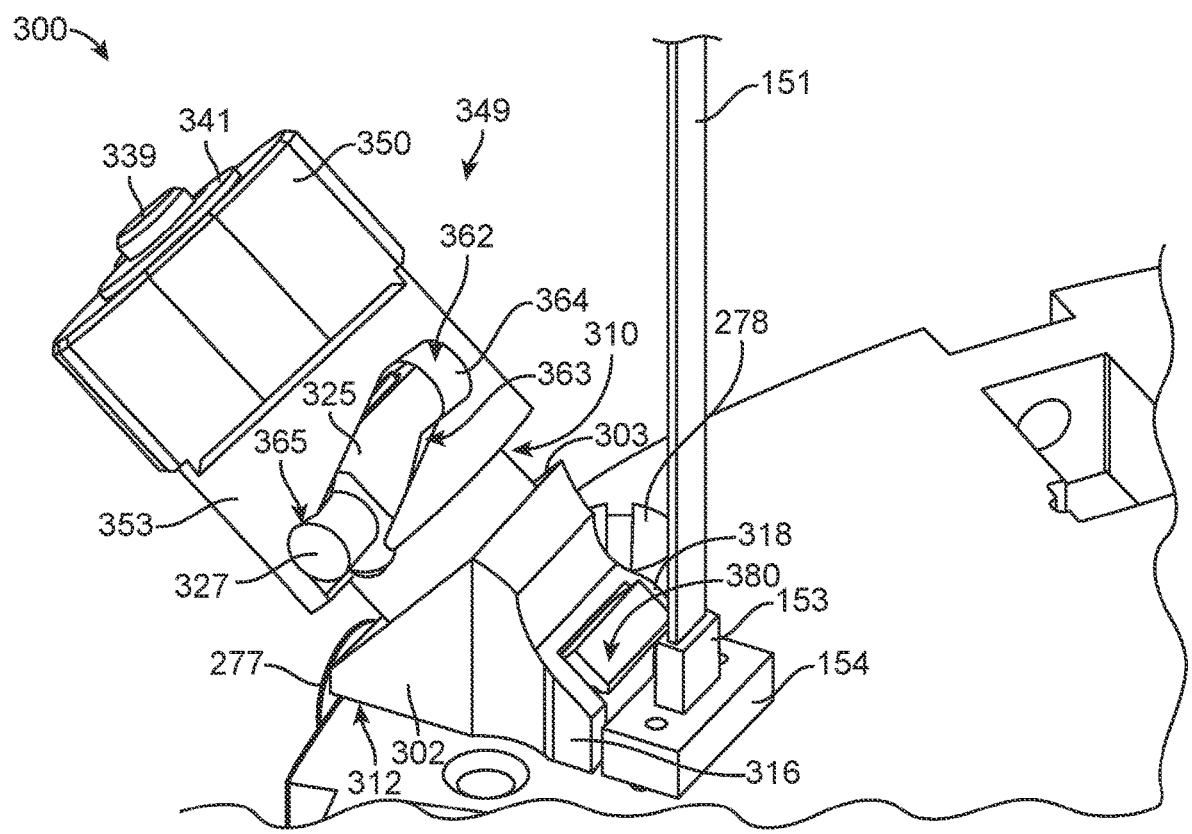
FIG. 14 is a perspective view of another embodiment clamp assembly and a fiber optic cable assembly connected to a fixture of an optical fiber polisher with the clamp assembly in an unclamped position.

In operation, when the clamp assembly 300 is positioned in an unclamped position 380, with the pins 327 and 328 of the clamp base 301 positioned in the openings or lower portions of the channels 358 and 362 in the detent latch portions 361 and 365 of the latch 349, holding the latch 349 in the unclamped positions. The unclamped position is shown in FIGS. 14, 15A, and 15B. The clamping member 367 contacts the clamp base 301 to prevent the shaft 331 from moving out of the clamp base 301, and the outer retaining member 341 acts as a stop for the latch 349. As the latch 349 is rotated upward out of the detent latch and about the clamp base 301, the pins 327 and 328 move along the respective ramp portions 359 and 363 and the biasing member 343 is moved into the bore 326 in an intermediate position 381, which positions the clamping member 367 to engage the connecting member, best shown in FIG. 16. When the pins 327 and 328 are positioned in the respective stop portions 360 and 364, the biasing member 343 is compressed, and the clamp assembly 300 is positioned in a clamped position 382, best shown in FIGS. 17, 18A, and 18B. The biasing member 343 biases the shaft 331 in a downward position, which transfers the force of the biasing member 343 from the outer retaining member 341 to the clamping member 367 to engage the connecting member, which in this example is a shoulder 154 of a fiber optic cable assembly 150. If the inner retaining member 337 were eliminated, the biasing member 343 would exert a biasing force against the base 301 and the biasing member 343 would be compressing during the entire rotation of the latch 349, causing more strain on the operator and the clamp assembly components. Therefore, the inner retaining member 337 is optional but preferred.

Figure 17:
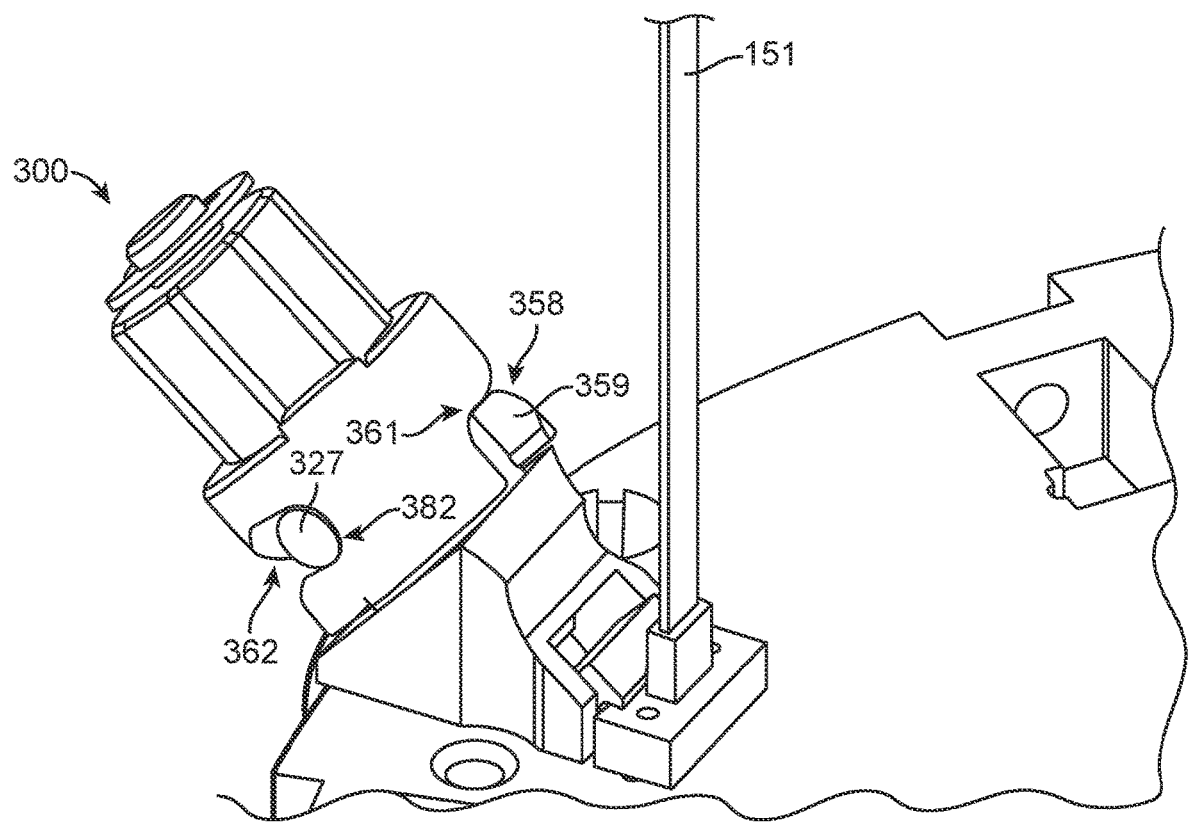
FIG. 17 is a perspective view of the clamp assembly and the fiber optic cable assembly connected to the fixture shown in FIG. 14 with the clamp assembly in a clamped position.

In the unclamped position 380, the biasing member 343 exerts a biasing force on the latch 349 contained on the shaft 331 between the outer retaining member 341 and the inner retaining member 337. In the intermediate position 381, the biasing member 343 is moved into the bore 326. In the clamped position 382, the latch 349 is locked into place relative to the clamp base 301 and the latch 349 compresses the biasing member 343, which transfers the downward biasing force of the biasing member 343 to the clamping member 367 and the fiber optic cable assembly 150. Therefore, when the clamp assembly 300 is moved from the unclamped position 380 into the clamped position 382, the biasing force is transferred from an upward biasing force to a downward biasing force. FIGS. 17, 18A, and 18B illustrate a gap between the latch 349 and the outer retaining member 341 because of the transfer of the biasing force.

As the latch 349 is rotated, the downward biasing force is not applied until the clamping member 367 is seated on the connecting member, when the last part of the rotation into the stop portions transfers the biasing force from the outer retaining member 341 to the connecting member. The biasing member 343 is captured between the inner retaining member 337 and the latch 349, which is held by the outer retaining member 341. There is approximately 8 to 9 pounds of preload on the biasing member 343 shown in this example, but it is recognized that there may be other biasing options that can get exceed 12 pounds if desired.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A toolless clamp for clamping a connecting member to a support structure, comprising:
   a shaft having an intermediate portion interconnecting a proximal end and a distal end;
   a base having a base bore configured and arranged to slidably receive a portion of the shaft;
   a latch having a latch bore configured and arranged to slidably receive a portion of the shaft and a portion of the base;
   a clamping member operatively connected to the proximal end of the shaft and configured and arranged to disengage the connecting member when the latch is in an unclamped position and engage the connecting member when the latch is in a clamped position; and
   a first biasing member configured and arranged to bias the latch in a first direction away from the clamping member in the unclamped position and bias the shaft and the clamping member in a second direction toward the base in the clamped position.

2. The toolless clamp of claim 1, wherein the shaft extends through the latch and includes an inner retaining member positioned on the intermediate portion within the latch bore and an outer retaining member positioned on the distal end outside of the latch, and wherein the first biasing member is positioned about the shaft between the inner retaining member and an upper ledge of the latch, the outer retaining member acting as a stop for the latch.

3. The toolless clamp of claim 2, further comprising a second biasing member positioned about the shaft between the inner retaining member and the base to disengage the clamping member from the connecting member in the unclamped position.

4. The toolless clamp of claim 2, further comprising:
   a pin extending laterally outward from the base; and
   a channel in the latch, the channel configured and arranged to receive the pin.

5. The toolless clamp of claim 4, wherein the channel includes a ramp portion and a stop portion, the pin moving through the ramp portion in an intermediate position, and the pin positioned in the stop portion in the clamped position.

6. The toolless clamp of claim 5, wherein a biasing force of the first biasing member is transferred from the outer retaining member to the connecting member when the pin is in the stop portion.

7. The toolless clamp of claim 5, further comprising a second biasing member positioned about the shaft between the inner retaining member and the base, the second biasing member configured and arranged to compress in the intermediate position.

8. A combination toolless clamp and fiber optic polishing fixture for polishing a cable of a fiber optic cable assembly, the fiber optic cable assembly including a shoulder, the combination comprising:
the toolless clamp comprising:
a shaft having an intermediate portion interconnecting a proximal end and a distal end;
a base having a base bore configured and arranged to slidably receive a portion of the shaft;
a latch having a latch bore configured and arranged to slidably receive a portion of the shaft and a portion of the base;
a clamping member operatively connected to the proximal end of the shaft and configured and arranged to disengage the connecting member when the latch is in an unclamped position and engage the connecting member when the latch is in a clamped position; and
a first biasing member configured and arranged to bias the latch in a first direction away from the clamping member in the unclamped position and bias the shaft and the clamping member in a second direction toward the base in the clamped position; and
the fiber optic polishing fixture comprising:
a fixture base having a cable assembly aperture and a clamping member cavity, the cable assembly aperture configured and arranged to receive a portion of the shoulder, and the clamping member cavity configured and arranged to slidably receive a portion of the clamping member.

9. The combination of claim 8, wherein the shaft extends through the latch and includes an inner retaining member positioned on the intermediate portion within the latch bore and an outer retaining member positioned on the distal end outside of the latch, and wherein the first biasing member is positioned about the shaft between the inner retaining member and an upper ledge of the latch, the outer retaining member acting as a stop for the latch.

10. The combination of claim 9, further comprising a second biasing member positioned about the shaft between the inner retaining member and the base to disengage the clamping member from the connecting member in the unclamped position.

11. The combination of claim 9, further comprising:
a pin extending laterally outward from the base; and
a channel in the latch, the channel configured and arranged to receive the pin.

12. The combination of claim 11, wherein the channel includes a ramp portion and a stop portion, the pin moving through the ramp portion in an intermediate position, and the pin positioned in the stop portion in the clamped position.

13. The combination of claim 12, wherein a biasing force of the first biasing member is transferred from the outer retaining member to the connecting member when the pin is in the stop portion.

14. The combination of claim 12, further comprising a second biasing member positioned about the shaft between the inner retaining member and the base, the second biasing member configured and arranged to compress in the intermediate position.

* * * * *